United States Patent
Naito et al.

(10) Patent No.: US 6,236,963 B1
(45) Date of Patent: May 22, 2001

(54) SPEAKER NORMALIZATION PROCESSOR APPARATUS FOR GENERATING FREQUENCY WARPING FUNCTION, AND SPEECH RECOGNITION APPARATUS WITH SAID SPEAKER NORMALIZATION PROCESSOR APPARATUS

(75) Inventors: Masaki Naito, Nara (JP); Li Deng, Kitchener (CA); Yoshinori Sagisaka, Kyoto (JP)

(73) Assignee: ATR Interpreting Telecommunications Research Laboratories, Kyoto (JP)

( * ) Notice: Subject to any disclaimer, the term of this patent is extended or adjusted under 35 U.S.C. 154(b) by 0 days.

(21) Appl. No.: 09/270,663

(22) Filed: Mar. 16, 1999

(30) Foreign Application Priority Data

| Mar. 16, 1998 | (JP) | 10-065270 |
| Jan. 20, 1999 | (JP) | 11-011720 |

(51) Int. Cl.$^7$ ............... G10L 15/12; G10L 15/14
(52) U.S. Cl. ............... 704/241; 704/234; 704/256
(58) Field of Search ............... 704/234, 241, 704/256

(56) References Cited

U.S. PATENT DOCUMENTS

| 4,941,178 | * | 7/1990 | Chuang | 704/252 |
| 5,327,521 | * | 7/1994 | Savic et al. | 704/272 |
| 5,450,522 | * | 9/1995 | Hermansky et al. | 704/200.1 |
| 5,625,747 | * | 4/1997 | Goldberg et al. | 704/243 |
| 5,930,753 | * | 7/1999 | Potamianos et al. | 704/256 |

FOREIGN PATENT DOCUMENTS

| 7261785 | 3/1994 | (JP) | G10L/3/00 |
| 8110792 | 12/1994 | (JP) | G10L/3/00 |

OTHER PUBLICATIONS

Li Lee and Richard C. Rose, "Speaker normalization using efficient frequency warping procedures," Proc. IEEE ICASSP 96, vol. 1, p. 353–356, May 1996.*

S. Umesh, L. Cohen, and D. Nelson, "Frequency–warping and speaker–normalization," Proc. IEEE ICASSP 97, vol. 2, p. 983–986, Apr. 1997.*

G. Fant, "Non–Uniform Vowel Normalization", Speech Transmission Laboratory Quarterly Progress and Status Report, 2–3, 1–19 (1975).

Tetsuo Kosaka, et al., "Speaker–independent speech recognition based on tree–structured speaker clustering", IEEE Translations on Neural Networks, vol. 4, No. 61, Nov. 1993.

(List continued on next page.)

Primary Examiner—Tālivaldis I. Šmits

(57) ABSTRACT

In a speaker normalization processor apparatus, a vocal-tract configuration estimator estimates feature quantities of a vocal-tract configuration showing an anatomical configuration of a vocal tract of each normalization-target speaker, by looking up to a correspondence between vocal-tract configuration parameters and Formant frequencies previously determined based on a vocal tract model of the standard speaker, based on speech waveform data of each normalization-target speaker. A frequency warping function generator estimates a vocal-tract area function of each normalization-target speaker by changing feature quantities of a vocal-tract configuration of the standard speaker based on the feature quantities of the vocal-tract configuration of each normalization-target speaker estimated by the estimation means and the feature quantities of the vocal-tract configuration of the standard speaker, estimating Formant frequencies of speech uttered by each normalization-target speaker based on the estimated vocal-tract area function of each normalization-target speaker, and generating a frequency warping function showing a correspondence between input speech frequencies and frequencies after frequency warping.

10 Claims, 25 Drawing Sheets

OTHER PUBLICATIONS

P. Zhan et al., "Speaker Normalization Based on Frequency Warping", Proceeding of ICASSP, pp. 1039–1042, 1997.

Lawrence R. Rabiner et al., Japanese translator K. Suzuki, "Digital Processing of Speech Signals", 1978 by Prentice–Hall, Inc., Japanese Edition published by Colonasha on Apr. 15, 1983, pp. 61–113 with partial English translation of the Japanese Edition pp. 74–79.

K. Ohkura et al., "Speaker adaptation based on transfer vector field smoothing model with continous mixture density HMMs", Technical report of the Institute of Electronics, Information and Communication Engineers, SP92–16, Jun. 1992, with English abstract on front page thereof.

Galvan, "Etudes dans le cadre de l'inversion acoustico articulatoire: Amelioration d'un modele articulatoire, normalisation du locuteur et recuperation du lieu de constriction des plosives", These de l'Institut National Polytechnique de Grenoble Specialite Sciences Cognitives, Apr., 1997. English translation of paragraph 2.4, pp. 10–13.

* cited by examiner

First Preferred Embodiment

Fig.2

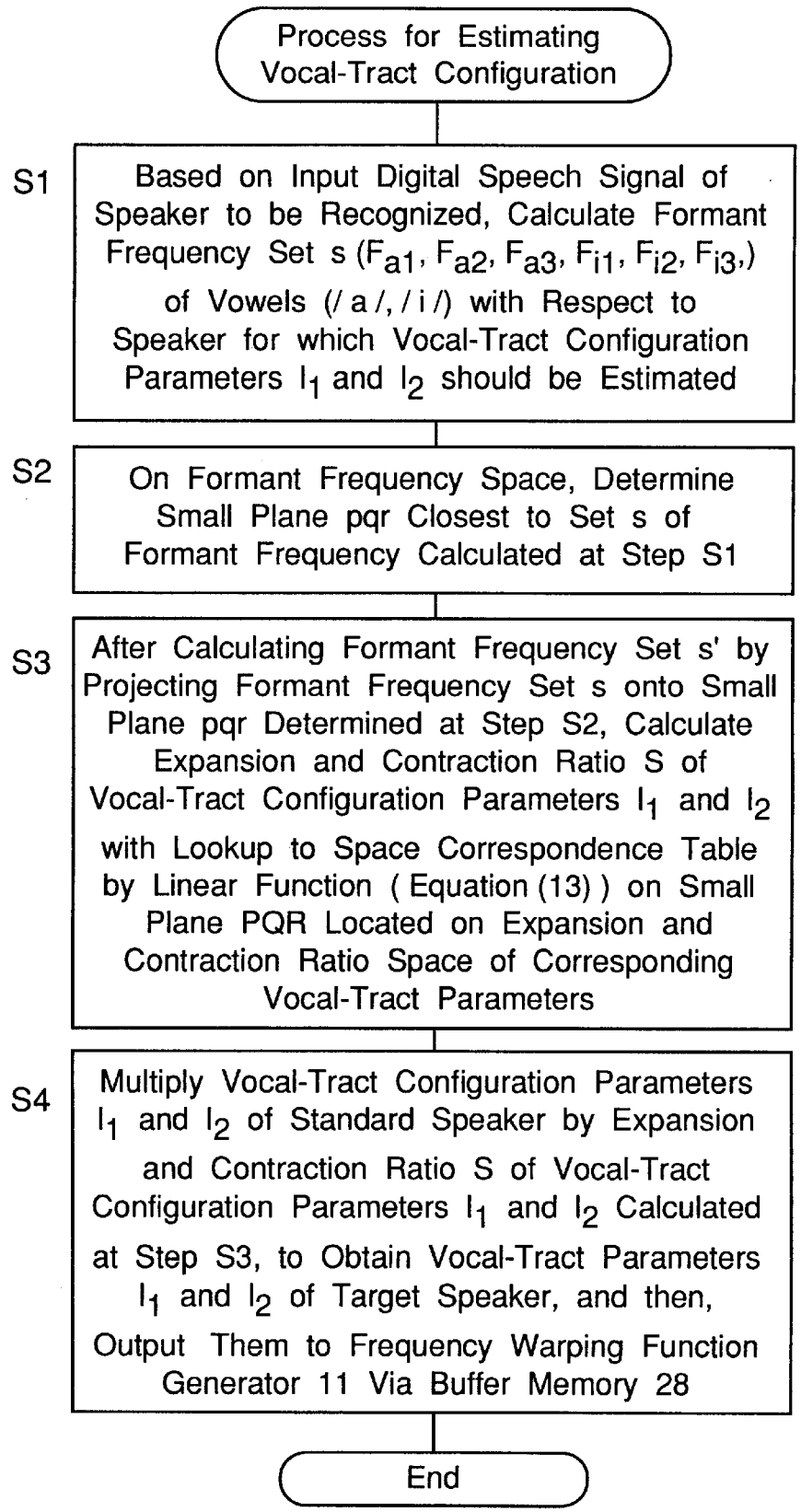

- S1 — Based on Input Digital Speech Signal of Speaker to be Recognized, Calculate Formant Frequency Set s ($F_{a1}$, $F_{a2}$, $F_{a3}$, $F_{i1}$, $F_{i2}$, $F_{i3}$,) of Vowels (/a/, /i/) with Respect to Speaker for which Vocal-Tract Configuration Parameters $l_1$ and $l_2$ should be Estimated

- S2 — On Formant Frequency Space, Determine Small Plane pqr Closest to Set s of Formant Frequency Calculated at Step S1

- S3 — After Calculating Formant Frequency Set s' by Projecting Formant Frequency Set s onto Small Plane pqr Determined at Step S2, Calculate Expansion and Contraction Ratio S of Vocal-Tract Configuration Parameters $l_1$ and $l_2$ with Lookup to Space Correspondence Table by Linear Function ( Equation (13) ) on Small Plane PQR Located on Expansion and Contraction Ratio Space of Corresponding Vocal-Tract Parameters

- S4 — Multiply Vocal-Tract Configuration Parameters $l_1$ and $l_2$ of Standard Speaker by Expansion and Contraction Ratio S of Vocal-Tract Configuration Parameters $l_1$ and $l_2$ Calculated at Step S3, to Obtain Vocal-Tract Parameters $l_1$ and $l_2$ of Target Speaker, and then, Output Them to Frequency Warping Function Generator 11 Via Buffer Memory 28

Fig.3

```
Process for Generating Frequency
        Warping Function
```

S11 — Estimate Formant Frequency of Speech Uttered by Standard Speaker Based on Vocal-Tract Area Function of Standard Speaker, and then, Store the Resulting Formant Frequency in Standard Speaker Formant Frequency Memory 26

S12 — Estimate Vocal-Tract Area Function of Each Recognition Speaker by Changing Vocal-Tract Configuration Parameters $l_1$ and $l_2$ of Standard Speaker Based on Vocal-Tract Configuration Parameters $l_1$ and $l_2$ of Each Recognition Speaker Estimated by Vocal-Tract Configuration Estimator 10 as well as on Vocal-Tract Configuration Parameters $l_1$ and $l_2$ of Standard Speaker, and then, Based on This Estimation, Estimate Formant Frequency of Each Phoneme of Speech Uttered by Each Recognition Speaker by the Method Similar to That of Step S11

S13 — Estimate Frequency Warping Function by Plotting Relationship between Formant Frequency of Standard Speaker and Formant Frequency of Each Recognition Speaker, into Graph of Frequency Warping Function, and then, Store the Resulting Frequency Warping Function into Frequency Warping Function Memory 27

End

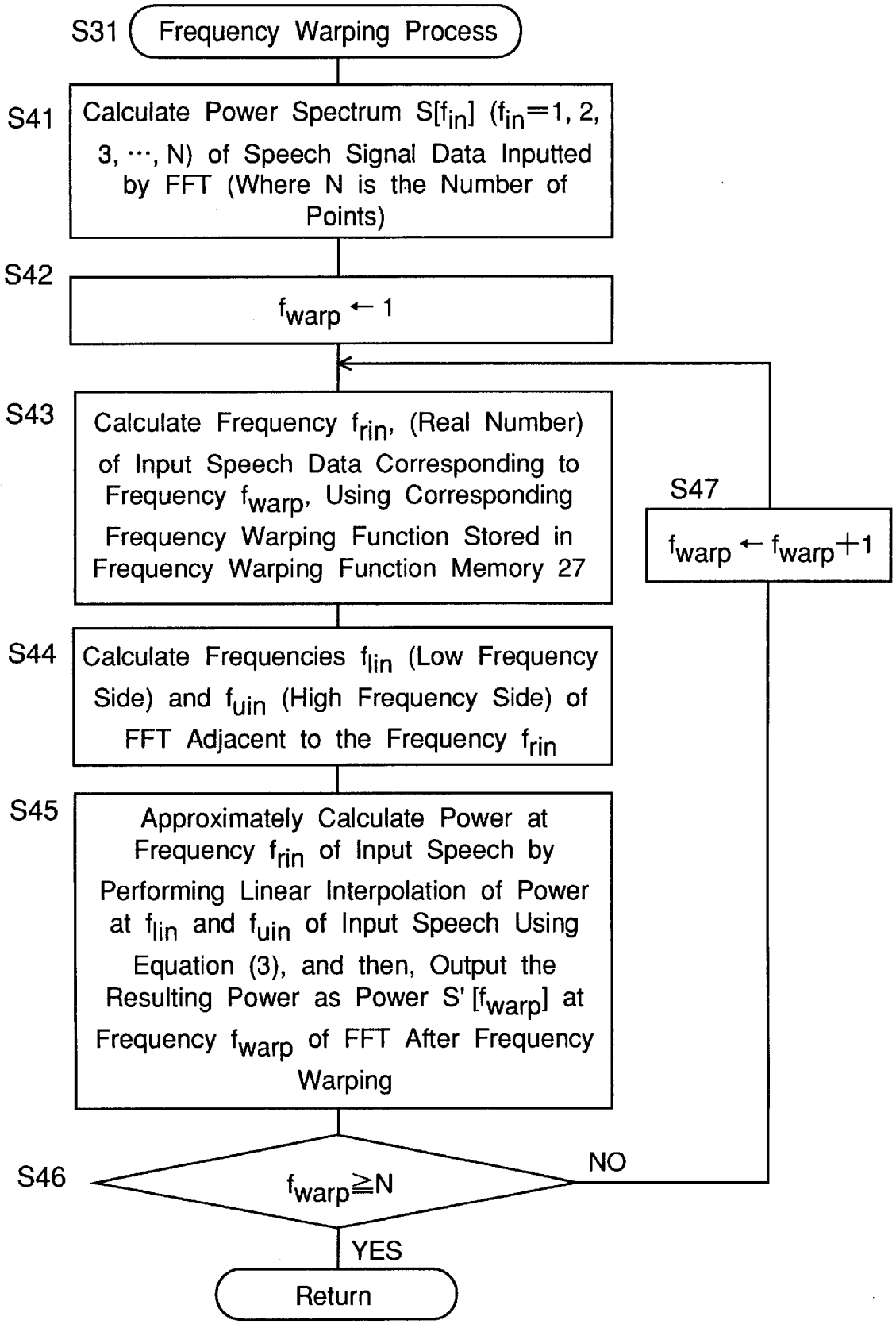

Model SM'm of Section SMm of Vocal-Tract Configuration

Vocal-Tract Configuration

Mapping Method Between Expansion and Contraction Ratio
Space of Vocal-Tract Parameters and Formant Frequency Space Expansion and Contraction Ratio
Space of Vocal-Tract Parameters Formant Frequency Space Method for Estimating Vocal-Tract Parameters Formant Frequency Space Expansion and Contraction Ratio Space of Vocal-Tract Parameters Vocal-Tract Cross-Sectional Area A(n) of
Vocal-Tract Cross Sections n−1 to n Vocal-Tract Area Function of
Vocal-Tract Configuration Equivalent Circuit of Vocal-Tract Model Method for Estimating Frequency
Warping Function Using Vocal-Tract Model Frequency Warping Process Plane of Frequency Warping Function FFT Plane Examples of Frequency Warping Functions Method for Selecting Frequency Warping Function Based on Likelihood Examples of Frequency Warping Functions Modified Maeda Model Fig.20 Second Preferred Embodiment

SPEAKER NORMALIZATION PROCESSOR APPARATUS FOR GENERATING FREQUENCY WARPING FUNCTION, AND SPEECH RECOGNITION APPARATUS WITH SAID SPEAKER NORMALIZATION PROCESSOR APPARATUS

BACKGROUND OF THE INVENTION

1. Field of the Invention

The present invention relates to a speaker normalization processor apparatus and a speech recognition apparatus together with the speaker normalization apparatus, and in particular, to a speaker normalization processor apparatus for generating a speaker-normalized optimal hidden Markov model (hereinafter, a hidden Markov model will be referred to as an HMM) based on speaker-normalizing speech waveform data of a plurality of training speakers, using a function for normalizing input frequencies to be directed to average Formant frequencies and by then training an initial HMM based on the speaker-normalized speech waveform data, and also relates to a speech recognition apparatus for performing speech recognition by using the generated HMM.

2. Description of the Prior Art

Conventionally, as a technique for speaker normalization, a speaker normalization technique using frequency warping with attention focused on vocal tract length (hereinafter, referred to as a prior art example) has been proposed, and its effectiveness has been reported (See, for example, Prior Art Document 1, P. Zhan et al., "Speaker Normalization Based on Frequency Warping", Proceeding of ICASSP, pp. 1039–1042, 1997). The speaker normalization technique based on the likelihood in this prior art example is a method comprising the steps of, using a plurality of frequency warping functions prepared in advance, performing frequency warping using these functions and then acoustic analysis, determining resultant likelihoods at which acoustic parameters are outputted from an initial acoustic model, and selecting the warping function having the highest likelihood. Hereinbelow, the method of selecting an optimal frequency warping function based on the likelihood as well as the procedure for speaker normalization training are explained.

First of all, the method of selecting a frequency warping function will be explained. In this case, as shown in FIG. 17, a frequency warping function optimal to each speaker is selected from a plurality of N frequency warping functions $F \in f_1, f_2, \ldots, f_N$ according to the following procedure:

(A1) Feature extractors 31-1 to 31-N perform frequency warping process for speech waveform data of one speaker m, using the frequency warping functions $F \in f_1, f_2, \ldots, f_N$ prepared in advance, and then, perform acoustic analysis;

(A2) A likelihood calculator 32 determines a likelihood by Viterbi search using correct-solution phoneme series with a lookup to a predetermined phoneme HMM 33 with respect to each of acoustic analysis results obtained by above (A1);

(A3) A maximum likelihood selector 34 selects a frequency warping function $f_{max}$ that gives a maximum likelihood among the frequency warping functions $f_1, f_2, \ldots f_N$ based on results of above (A2); and (A4) A feature extractor 35 performs frequency warping process for inputted speech waveform data of the speaker m using the frequency warping function $f_{max}$, and then, acoustic analysis, thereby outputting normalized feature parameters. These feature parameters are used for, for example, speech recognition.

Next, the procedure for speaker normalization training will be explained. It is assumed here that, for the training, two different speech data sets, speech data for the selection of a frequency warping function and speech data for training, are used.

(B1) Acoustic analysis of speech waveform data for adaptation or training of all the training speakers is performed, by which acoustic feature parameters are obtained. For these acoustic feature parameters, mel-frequency cepstrum coefficients or the like, which have been known to those skilled in the art, is used;

(B2) The frequency warping function $f_{max}$ that gives a maximum likelihood on the speech data for the selection of a frequency warping function of each training speaker is selected based on a trained acoustic model $\Lambda_i$;

(B3) Frequency warping using the frequency warping function selected for each speaker, and then, acoustic analysis of the speech data for training, are performed, by which the acoustic feature parameters are determined;

(B4) The acoustic model $\Lambda_i$ is trained based on acoustic analysis results obtained by above (B3); and (B5) Then, the process of (B2)–(B4) is repeated to a designated number of times.

FIG. 18 is a graph showing examples of frequency warping functions in the prior art example. The function shown in FIG. 18 represents the correspondence between frequencies before and after performing the frequency warping by a linear frequency warping function determined by a frequency warping coefficient α. With a coefficient φ determined, if the normalized frequency f of input speech is not more than φ, the frequency warping function is given by the following equation:

$$f' = \alpha \cdot f \text{ for } 0 < f \leq \phi \quad (1),$$

and when the frequency f of input speech is within a range of φ to one, the frequency warping function is given by the following line that interconnects coordinates (φ, f·φ) and coordinates (1.0, 1.0) shown in FIG. 18:

$$f' = \{(\alpha \cdot \phi - 1) \cdot f - (\alpha - 1) \cdot \phi\}/(\phi - 1) \text{ for } \phi < f \leq 1.0. \quad (2)$$

For the execution of speaker normalization, a plurality of frequency warping functions different in this frequency warping coefficient a from one another are prepared, and among those, a frequency warping function having a maximum likelihood is selected. The terms "frequency warping" is referred herein to as a process of shifting each frequency of speech waveform data of one target speaker to its corresponding average frequency of all the speakers by using, for example, the frequency warping functions of FIG. 18.

However, for the method of the prior art example, it is necessary to previously specify the configuration of the frequency warping function. Also, since the frequency warping coefficient α is given as a discrete value, there has been a problem that detailed frequency warping functions could not be estimated. Further, when speech recognition is performed using an HMM speaker-normalized and trained by the speaker normalization method of the prior art example, there has been a problem that significant improvement in the speech recognition rate by normalization could not be obtained.

SUMMARY OF THE INVENTION

An essential object of the present invention is to provide a speaker normalization processor apparatus capable of generating an acoustic model of high recognition performance by estimating a frequency warping function from target speaker to standard speaker at higher accuracy as compared with the prior art example, and by performing speaker normalization and training using the estimated frequency warping function.

Another object of the present invention is to provide a speech recognition apparatus capable of accomplishing speech recognition at a higher speech recognition rate as compared with the prior art example by using an HMM generated by the speaker normalization processor.

In order to achieve the above-mentioned objective, according to one aspect of the present invention, there is provided a speaker normalization processor apparatus comprising:

a first storage unit for storing speech waveform data of a plurality of normalization-target speakers and text data corresponding to the speech waveform data;

a second storage unit for storing Formant frequencies of a standard speaker determined based on a vocal-tract area function of the standard speaker;

estimation means for estimating feature quantities of a vocal-tract configuration showing an anatomical configuration of a vocal tract of each normalization-target speaker, by looking up to a correspondence between vocal-tract configuration parameters and Formant frequencies previously determined based on a vocal tract model of the standard speaker, based on the speech waveform data of each normalization-target speaker stored in said first storage unit;

function generating means for estimating a vocal-tract area function of each normalization-target speaker by changing feature quantities of a vocal-tract configuration of the standard speaker based on the feature quantities of the vocal-tract configuration of each normalization-target speaker estimated by said estimation means and the feature quantities of the vocal-tract configuration of the standard speaker, estimating Formant frequencies of speech uttered by each normalization-target speaker based on the estimated vocal-tract area function of each normalization-target speaker, and generating a frequency warping function, which shows a correspondence between input speech frequencies and frequencies after frequency warping, and which is used for performing the frequency warping by converting an input speech frequency so that Formant frequencies of speech of each normalization-target speaker after the frequency warping respectively coincide with the corresponding Formant frequencies of the standard speaker stored in said second storage unit.

According to another aspect of the present invention, there is provided a speaker normalization processor apparatus comprising:

a first storage unit for storing speech waveform data of a plurality of training speakers and text data corresponding to the speech waveform data;

a second storage unit for storing Formant frequencies of a standard speaker determined based on a vocal-tract area function of the standard speaker;

first estimation means for estimating feature quantities of a vocal-tract configuration showing an anatomical configuration of a vocal tract of each training speaker, by looking up to a correspondence between vocal-tract configuration parameters and Formant frequencies previously determined based on a vocal tract model of the standard speaker, based on the speech waveform data of each training speaker stored in said first storage unit;

first function generating means for estimating a vocal-tract area function of each training speaker by changing feature quantities of a vocal-tract configuration of the standard speaker based on the feature quantities of the vocal-tract configuration of each training speaker estimated by said first estimation means and the feature quantities of the vocal-tract configuration of the standard speaker, estimating Formant frequencies of speech uttered by each training speaker based on the estimated vocal-tract area function of each training speaker, and generating a frequency warping function, which shows a correspondence between input speech frequencies and frequencies after frequency warping, and which is used for performing the frequency warping by converting an input speech frequency so that Formant frequencies of speech of each training speaker after the frequency warping respectively coincide with the corresponding Formant frequencies of the standard speaker stored in said second storage unit;

first feature extraction means for speaker-normalizing speech waveform data of each training speaker stored in said first storage unit, by executing a frequency warping process on the speech waveform data using the frequency warping function of each training speaker generated by said first function generating means, and then extracting predetermined acoustic feature parameters of each training speaker from the speaker-normalized speech waveform data; and training means for generating a normalized hidden Markov model by training a predetermined initial hidden Markov model using a predetermined training method based on the acoustic feature parameters of each training speaker extracted by said first feature extraction means and the text data stored in said first storage unit.

In the above-mentioned speaker normalization processor apparatus, the feature quantities of the vocal-tract configuration preferably include a first length on an oral cavity side and a second length on a pharyngeal cavity side of a vocal tract of a speaker.

In the above-mentioned speaker normalization processor apparatus, the acoustic feature parameters preferably include mel-frequency cepstrum coefficients.

According to a further aspect of the present invention, there is provided a speech recognition apparatus comprising:

a first storage unit for storing speech waveform data of a plurality of training speakers and text data corresponding to the speech waveform data;

a second storage unit for storing Formant frequencies of a standard speaker determined based on a vocal-tract area function of the standard speaker;

first estimation means for estimating feature quantities of a vocal-tract configuration showing an anatomical configuration of a vocal tract of each training speaker, by looking up to a correspondence between vocal-tract configuration parameters and Formant frequencies previously determined based on a vocal tract model of the standard speaker, based on the speech waveform data of each training speaker stored in said first storage unit;

first function generating means for estimating a vocal-tract area function of each training speaker by changing feature quantities of a vocal-tract configuration of the standard speaker based on the feature quantities of the vocal-tract configuration of each training speaker estimated by said first estimation means and the feature quantities of the vocal-tract configuration of the standard speaker, estimating Formant frequencies of speech uttered by each training speaker based on the estimated vocal-tract area function of each training speaker, and generating a frequency warping function, which shows a correspondence between input speech frequencies and frequencies after frequency warping, and which is used for performing the frequency warping by converting an input speech frequency so that Formant frequencies of speech of each training speaker after the frequency warping respectively coincide with the corresponding Formant frequencies of the standard speaker stored in said second storage unit;

first feature extraction means for speaker-normalizing speech waveform data of each training speaker stored in said first storage unit, by executing a frequency warping process on the speech waveform data using the frequency warping function of each training speaker generated by said first function generating means, and then extracting predetermined acoustic feature parameters of each training speaker from the speaker-normalized speech waveform data;

training means for generating a normalized hidden Markov model by training a predetermined initial hidden Markov model using a predetermined training method based on the acoustic feature parameters of each training speaker extracted by said first feature extraction means and the text data stored in said first storage unit;

second estimation means for estimating feature quantities of a vocal-tract configuration showing an anatomical configuration of a vocal tract of a speech-recognition speaker, by looking up to a correspondence between vocal-tract configuration parameters and Formant frequencies previously determined based on a vocal tract model of the standard speaker, based on input speech waveform data for adaptation of a speech-recognition speaker;

second function generating means for estimating a vocal-tract area function of each speech-recognition speaker by changing the feature quantities of the vocal-tract configuration of the standard speaker based on the feature quantities of the vocal-tract configuration of the speech-recognition speaker estimated by said second estimation means and the feature quantities of the vocal-tract configuration of the standard speaker, estimating Formant frequencies of speech uttered by each speech-recognition speaker based on the estimated vocal-tract area function of each speech-recognition speaker, and generating a frequency warping function of the speech-recognition speaker, which shows a correspondence between input speech frequencies and frequencies after frequency warping, and which is used for performing the frequency warping by converting an input speech frequency so that Formant frequencies of speech of each speech-recognition speaker after the frequency warping respectively coincide with the corresponding Formant frequencies of the standard speaker stored in said second storage unit;

a third storage unit for storing the frequency warping function of a speech-recognition speaker generated by said second function generating means;

second feature extraction means for speaker-normalizing speech waveform data of speech uttered by a speech-recognition speaker to be recognized by executing a frequency warping process on the speech waveform data using the frequency warping function of the speech-recognition speaker stored in said third storage unit, and then extracting predetermined acoustic feature parameters of the speech-recognition speaker from the speaker-normalized speech waveform data; and speech recognition means for recognizing the input speech uttered by the speech-recognition speaker by using a hidden Markov model generated by said training means based on the acoustic feature parameters extracted by said second feature extraction means, and then outputting a result of the speech recognition.

According to the present invention, since a frequency warping function can be generated from vocal-tract configuration feature quantities and speech generation models extracted from Formant frequencies of two vowels, it becomes possible to implement speaker normalization based on a small quantity of speech data. Also, since it is unnecessary to specify the configuration of the frequency warping function in advance, as would be done in the frequency warping function selection method based on the likelihood (prior art), more detailed frequency warping functions can be generated. Thus, using the frequency warping function generated based on the method of the present preferred embodiment makes it possible to implement high-speed, high-performance speaker adaptation. Furthermore, for speech speech-recognition speaker normalization is done on speech signal data to be recognized by using a corresponding frequency warping function, and then by using HMMs obtained by feature extraction, speaker normalization and training. Therefore, the speech recognition can be accomplished at a higher speech recognition rate than the prior art example.

According to one aspect of the present invention, there is provided a speaker normalization processor apparatus comprising:

a first storage unit for storing speech waveform data of a plurality of normalization-target speakers and text data corresponding to the speech waveform data;

a second storage unit for storing Formant frequencies of a standard speaker determined based on a vocal-tract area function of the standard speaker;

estimation means for estimating feature quantities of a vocal-tract configuration showing an anatomical configuration of a vocal tract of each normalization-target speaker, for each of predetermined similar phoneme contexts that are similar in acoustic features to each other, by looking up to a correspondence between vocal-tract configuration parameters and Formant frequencies previously determined based on a vocal tract model of the standard speaker, based on the speech waveform data of each normalization-target speaker stored in said first storage unit;

function generating means for estimating, for each of the similar phoneme contexts, a vocal-tract area function of each normalization-target speaker by changing feature quantities of a vocal-tract configuration of the standard speaker based on the feature quantities of the vocal-tract configuration of each normalization-target speaker estimated for each of the similar phoneme contexts by said estimation means and the feature quantities of the vocal-tract configuration of the standard speaker, estimating Formant frequencies of speech uttered by each normalization-target speaker based on the vocal-tract area function of each normalization-target speaker estimated for each of the similar phoneme contexts, and generating for each of the similar phoneme contexts a frequency warping function, which shows a correspondence between input speech frequencies and frequencies after frequency warping, and which is used for performing the frequency warping by converting an input speech frequency so that Formant frequencies of speech of each normalization-target speaker after the frequency warping respectively coincide with the corresponding Formant frequencies of the standard speaker stored in said second storage unit.

According to another aspect of the present invention, there is provided a speech recognition apparatus comprising:

a first storage unit for storing speech waveform data of a plurality of training speakers and text data corresponding to the speech waveform data;

a second storage unit for storing, for each of predetermined similar phoneme contexts that are similar in acoustic features to one another, Formant frequencies of a standard speaker determined based on a vocal-tract area function of the standard speaker;

first estimation means for estimating, for each of the similar phoneme contexts, feature quantities of a vocal-tract configuration showing an anatomical configuration of a vocal tract of each training speaker, by looking up to a correspondence between vocal-tract configuration parameters and Formant frequencies previously determined based on a vocal tract model of the standard speaker, based on the speech waveform data of each training speaker stored in said first storage unit;

first function generating means for estimating, for each of the similar phoneme contexts, a vocal-tract area function of each training speaker by changing feature quantities of a vocal-tract configuration of the standard speaker based on the feature quantities of the vocal-tract configuration of each training speaker estimated for each of the similar phoneme contexts by said first estimation means and the feature quantities of the vocal-tract configuration of the standard speaker, estimating for each of the similar phoneme contexts, Formant frequencies of speech uttered by each training speaker based on the vocal-tract area function of each training speaker estimated for each of the similar phoneme contexts, and generating for each of the similar phoneme contexts a frequency warping function, which shows a correspondence between input speech frequencies and frequencies after frequency warping, and which is used for performing the frequency warping by converting an input speech frequency so that Formant frequencies of speech of each training speaker after the frequency warping respectively coincide with the corresponding Formant frequencies of the standard speaker stored in said second storage unit;

first feature extraction means for speaker-normalizing the speech waveform data of each training speaker stored in said first storage unit by executing a frequency warping process on the speech waveform data using the frequency warping function of each training speaker generated for each of the similar phoneme contexts by said first function generating means, and then extracting, for each of the similar phoneme contexts, predetermined acoustic feature parameters of each training speaker from the speaker-normalized speech waveform data; and training means for generating a normalized hidden Markov model by training a predetermined initial hidden Markov model using a predetermined training method based on the acoustic feature parameters of each training speaker extracted for each of the similar phoneme contexts by said first feature extraction means and the text data stored in said first storage unit.

In the above-mentioned speaker normalization processor apparatus, the feature quantities of the vocal-tract configuration preferably include parameters of vocal-tract cross sections ranging from an oral cavity side to a pharyngeal cavity side of a vocal tract of a speaker.

In the above-mentioned speaker normalization processor apparatus, the similar phoneme context preferably includes at least one of vowel, phoneme, and hidden Markov model state.

According to a further aspect of the present invention, there is provided a speech recognition apparatus comprising:

a first storage unit for storing speech waveform data of a plurality of training speakers and text data corresponding to the speech waveform data;

a second storage unit for storing, for each of predetermined similar phoneme contexts that are similar in acoustic features to one another, Formant frequencies of a standard speaker determined based on a vocal-tract area function of the standard speaker;

first estimation means for estimating, for each of the similar phoneme contexts, feature quantities of a vocal-tract configuration showing an anatomical configuration of a vocal tract of each training speaker, by looking up to a correspondence between vocal-tract configuration parameters and Formant frequencies previously determined based on a vocal tract model of the standard speaker, based on the speech waveform data of each training speaker stored in said first storage unit;

first function generating means for estimating, for each of the similar phoneme contexts, a vocal-tract area function of each training speaker by changing feature quantities of a vocal-tract configuration of the standard speaker based on the feature quantities of the vocal-tract configuration of each training speaker estimated for each of the similar phoneme contexts by said first estimation means and the feature quantities of the vocal-tract configuration of the standard speaker, estimating for each of the similar phoneme contexts, Formant frequencies of speech uttered by each training speaker based on the vocal-tract area function of each training speaker estimated for each of the similar phoneme contexts, and generating for each of the similar phoneme contexts a frequency warping function, which shows a correspondence between input speech frequencies and frequencies after frequency warping, and which is used for performing the frequency warping by converting an input speech frequency so that Formant frequencies of speech of each training speaker after the frequency warping respectively coincide with the corresponding Formant frequencies of the standard speaker stored in said second storage unit;

first feature extraction means for speaker-normalizing the speech waveform data of each training speaker stored in said first storage unit by executing a frequency warping process on the speech waveform data using the frequency warping function of each training speaker generated for each of the similar phoneme contexts by said first function generating means, and then extracting, for each of the similar phoneme contexts, predetermined acoustic feature parameters of each training speaker from the speaker-normalized speech waveform data;

training means for generating a normalized hidden Markov model by training a predetermined initial hidden Markov model using a predetermined training method based on the acoustic feature parameters of each training speaker extracted for each of the similar phoneme contexts by said first feature extraction means and the text data stored in said first storage unit;

second estimation means for estimating, for each of the similar phoneme contexts, feature quantities of a vocal-tract configuration showing an anatomical configuration of a vocal tract of a speech-recognition speaker, by looking up to a correspondence between vocal-tract configuration parameters and Formant frequencies previously determined based on a vocal tract model of the standard speaker, based on input speech waveform data for adaptation of a speech-recognition speaker;

second function generating means for estimating, for each of the similar phoneme contexts, a vocal-tract area function of each speech-recognition speaker by converting the feature quantities of the vocal-tract configuration of the standard speaker based on the feature quantities of the vocal-tract configuration of the speech-recognition speaker estimated for each of the similar phoneme contexts by said second estimation means and the feature quantities of the vocal-tract configuration of the standard speaker, estimating for each of the similar, phoneme contexts, Formant frequencies of speech uttered by each speech-recognition speaker based on the vocal-tract area function of each speech-recognition speaker estimated for each of the similar phoneme contexts, generating for each of the similar phoneme contexts a frequency warping function of the speech-recognition speaker, which shows a correspondence between input speech frequencies and frequencies after frequency warping, and which is used for performing the frequency warping by converting an input speech frequency so that Formant frequencies of speech of each speech-recognition speaker after the frequency warping respectively coincide with the corresponding Formant frequencies of the standard speaker stored in said second storage unit, and further generating information as to correspondence between the similar phoneme contexts and the frequency warping functions;

a third storage unit for storing the frequency warping function of a speech-recognition speaker generated for each of the similar phoneme contexts by said second function generating means;

a fourth storage unit for storing the information as to the correspondence between the similar phoneme contexts and the frequency warping functions of the speech-recognition speaker generated by said second function generating means;

second feature extraction means for speaker-normalizing the speech waveform data of speech uttered by a speech-recognition speaker to be recognized by executing a frequency warping process on the speech waveform data using the frequency warping function of the speech-recognition speaker stored for each of the similar phoneme contexts in said third storage unit, and then extracting for each of the similar phoneme contexts predetermined acoustic feature parameters of the speech-recognition speaker from the speaker-normalized speech waveform data; and speech recognition means for recognizing the input speech uttered by the speech-recognition speaker by looking up to the information as to the correspondence between the similar phoneme contexts and the frequency warping functions of the speech-recognition speaker stored in said fourth storage unit, and by using a hidden Markov model generated by said training means based on the acoustic feature parameters extracted for each of the similar phoneme contexts by said second feature extraction means, and then outputting a result of the speech recognition.

According to the present invention, by performing phoneme recognition using frequency warping functions for individual similar phoneme contexts according to the second preferred embodiment, a greatly improved phoneme recognition rate can be obtained while the data amount of adaptation necessary for the estimation of speaker normalization parameters can be reduced to a large extent.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 2 is a flow chart showing a process for estimating a vocal-tract configuration which is executed by a vocal-tract configuration estimator 10 of FIG. 1;

FIG. 3 is a flow chart showing a process for generating a frequency warping function which is executed by a frequency warping function generator 11 of FIG. 1;

FIG. 6 is a flow chart showing a frequency warping process which is a subroutine of FIG. 5;

FIGS. 8A and 8B show a method for mapping between an expansion and contraction ratio space of vocal-tract configuration parameters and a Formant frequency space, which is executed by the vocal-tract configuration estimating process of FIG. 2, wherein FIG. 8A is a chart showing an expansion and contraction ratio space of vocal-tract configuration parameters and FIG. 8B is a chart showing a Formant frequency space;

FIGS. 9A and 9B show a method for estimating vocal-tract configuration parameters, which is executed by the vocal-tract configuration estimating process of FIG. 2, wherein FIG. 9A is a chart showing an expansion and contraction ratio space of vocal-tract configuration parameters and FIG. 9B is a chart showing a Formant frequency space;

FIGS. 13A and 13B are graphs each showing a frequency warping process which is executed by the feature extractor 3 of FIG. 1, wherein FIG. 13A is a graph of the frequency warping function plane and FIG. 13B is a graph of the FFT plane;

DETAILED DESCRIPTION OF THE PREFERRED EMBODIMENTS

Hereinbelow, preferred embodiments of the present invention are described with reference to the accompanying drawings.

First Preferred Embodiment

Figure 1:
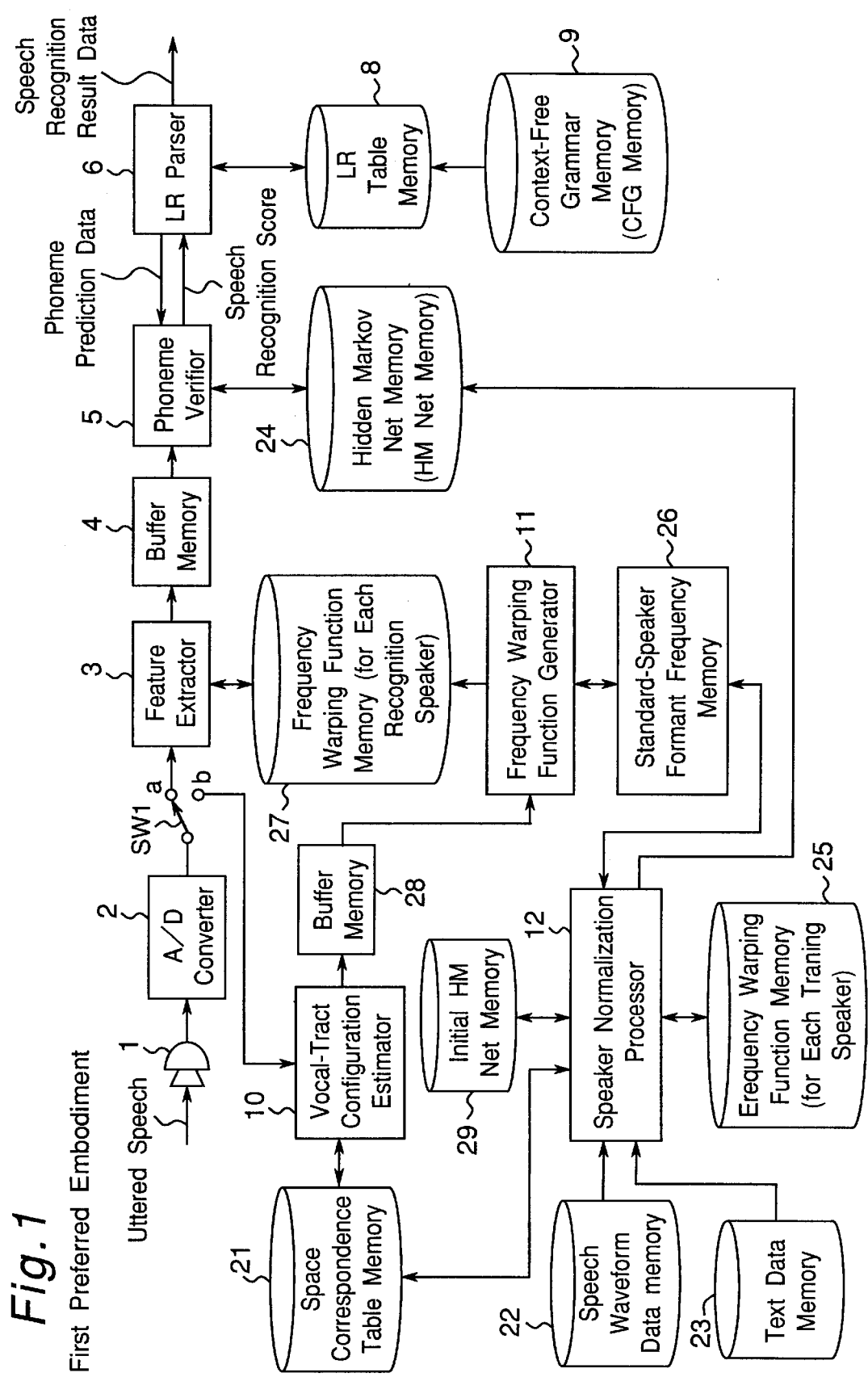
FIG. 1 is a block diagram showing a constitution of a speech recognition apparatus which is a first preferred embodiment of the present invention.

FIG. 1 is a block diagram showing a constitution of a speech recognition apparatus which is a first preferred embodiment according to the present invention. The speech recognition apparatus of the present preferred embodiment is characterized by comprising a vocal-tract configuration estimator 10, a frequency warping function generator 11, a speaker normalization processor 12 and a feature extractor 3 including frequency warping process.

Figure 7B:
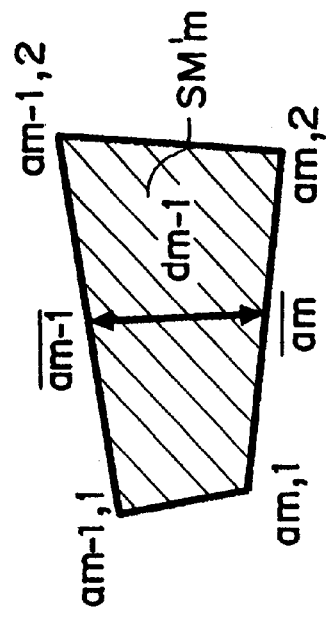
FIG. 7B is a sectional view showing a model SMm' of a section SMm of the vocal-tract configuration which is a result of modeling the vocal-tract configuration of FIG. 7A.
Figure 7A:
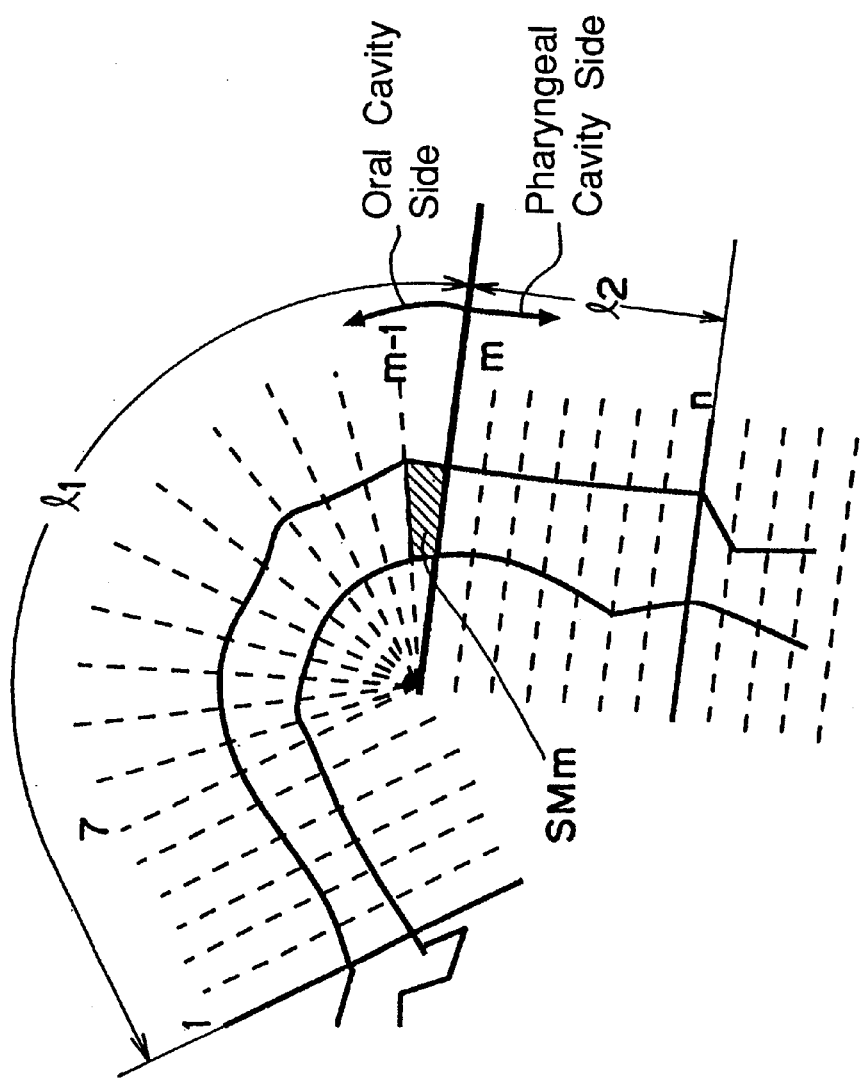
FIG. 7A is a sectional view showing a vocal-tract configuration of a person.

First of all, feature quantities of an anatomical configuration of a human vocal tract (hereinafter, referred to as vocal-tract configuration) which is used for speaker normalization and speech recognition as well as a method for estimating the feature quantities are described. In studies on speaker normalization, the normalization is performed by focusing principally on the vocal tract length VTL of a speaker. However, acoustic features of speech of a speaker characterized only by the vocal tract length VTL are limitative (See, for example, Prior Art Document 2, G. Fant, "Non-uniform vowel normalization", Speech Transmission Laboratory Quarterly Progress and Status Report, Vol. 2–3, pp. 1–19, 1975). Therefore, in the present preferred embodiment, the feature quantities of a vocal-tract configuration used in speaker clustering are given by dividing the vocal tract into front (oral cavity side) and rear (pharyngeal cavity side) two sections as shown in FIG. 7 and taking two parameters of their respective lengths $l_1$ and $l_2$ (hereinafter, referred to as vocal-tract configuration parameters). The reasons why these vocal-tract configuration parameters are chosen are as follows:

(1) Speech uttered by a speaker is largely affected by the front and rear lengths of the vocal tract (See, for example, Prior Art Document 2);

(2) A relatively simple method for estimating these vocal-tract configuration parameters has been proposed; and (3) These parameters are a simple extension of the vocal tract length generally used in the studies of speaker normalization.

The point at which the two sections of oral cavity side and pharyngeal cavity side are divided is, preferably, set to near an intermediate point between the oral cavity and the pharynx.

In the present preferred embodiment, the vocal-tract configuration parameters $l_1$ and $l_2$ are estimated using a method of mapping from a Formant frequency space to a vocal-tract configuration parameter space as described below, by using Formant frequencies $F_1$, $F_2$ and $F_3$ of the speaker's two vowels /a/ and /i/. The following vocal-tract model is used for the estimation of the vocal-tract configuration parameters $l_1$ and $l_2$. Also, totally six Formant frequencies ($F_{a1}$, $F_{a2}$, $F_{a3}$, $F_{i1}$, $F_{i2}$, $F_{i3}$) are set to discriminate among the Formant frequencies of the two vowels /a/ and /i/.

For the modeling of human vocal-tract configurations, in general, a model is derived from the areas of individual cross sections obtained by cutting the vocal tract into round slices at n places, and from the distances dm−1 between the cross sections. Use of this model makes it possible to generate speech uttered by each speaker, based on the vocal-tract configuration of the speaker. On the other hand, in use of the model for speech recognition apparatuses, because such a vocal-tract configuration is difficult to measure, there is a need for estimating the vocal-tract configuration based on speech uttered by each speaker. Among feature quantities of such a vocal-tract configuration, in particular, the oral-cavity side length $l_1$ and the pharyngeal-cavity side length $l_2$ of the vocal tract, and the vocal tract length VTL largely affect the speech uttered by each speaker, and therefore used as the feature quantities of vocal-tract configurations.

In the case where the lengths $l_1$ and $l_2$ of two sections resulting from dividing the vocal tract into oral-cavity side and pharyngeal-cavity side two divisions at a section SMm are used as the feature quantities of the speaker's vocal-tract configuration, these feature quantities are calculated based on the above-mentioned vocal-tract configuration model by the following equations:

$$l_1 = \sum_{i=1}^{m-1} d_i, \text{ and} \quad (3)$$

$$l_2 = \sum_{i=m}^{n-1} d_i. \quad (4)$$

Also, when the vocal tract length VTL is used as a feature quantity of the speaker's vocal-tract configuration, this feature quantity is calculated based on the above-mentioned vocal-tract configuration model by the following equation:

$$VTL = \sum_{i=1}^{n-1} d_i. \qquad (5)$$

The above model represents the vocal-tract configuration of a speaker by two parameters that are independent of uttered phonemes, i.e., the oral-cavity side length $l_1$ of the vocal tract and the pharyngeal-cavity side length $l_2$ of the vocal tract. In this vocal-tract model, with vocal-tract configuration parameters $l_1$ and $l_2$ of a standard speaker as well as vocal-tract area functions corresponding to individual vowels prepared, by expanding and contracting the two vocal-tract configuration parameters $l_1$ and $l_2$ to some fold independently of each other and then generating speech, Formant frequencies of individual vowels uttered from vocal tracts of different configurations can be obtained.

Figure 10B:
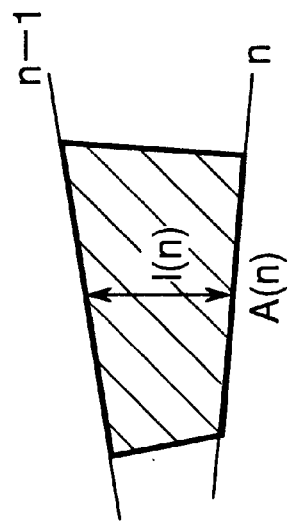
FIG. 10B is a sectional view showing a vocal-tract cross-sectional area A(n) of vocal-tract cross sections n–1 to n of the vocal tract configuration.
Figure 10A:
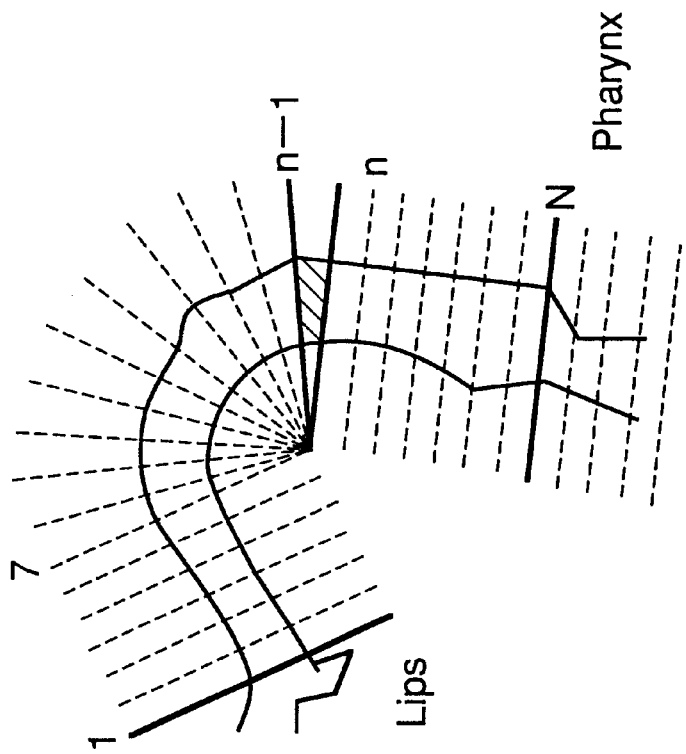
FIG. 10A is a sectional view showing a vocal-tract area function of vocal-tract configurations, which is used in the vocal-tract configuration estimating process by the vocal-tract configuration estimator 10 of FIG. 1.

In this connection, the method for calculating Formant frequencies from the prepared vocal-tract area functions is as follows. The vocal tract model illustrated in FIG. 10A can be represented by an equivalent circuit expressed by FIG. 10B. In this case, if the vocal-tract cross-sectional area at a cross section n of the vocal tract is A(n), the distance from cross sections n−1 to n of the vocal tract is l(n), the air density in the tract is ρ and the acoustic velocity is c, then the acoustic inductance L(n) of the n-th cross section and the acoustic capacitance C(n) of the n-th cross section can be represented by the following equations:

$$L(n) = \{\rho \cdot l(n)\}/\{2 \cdot A(n)\} \qquad (6),$$

and $$C(n) = \{A(n) \cdot l(n)\}/(\rho \cdot c^2) \qquad (7).$$

Figure 11:
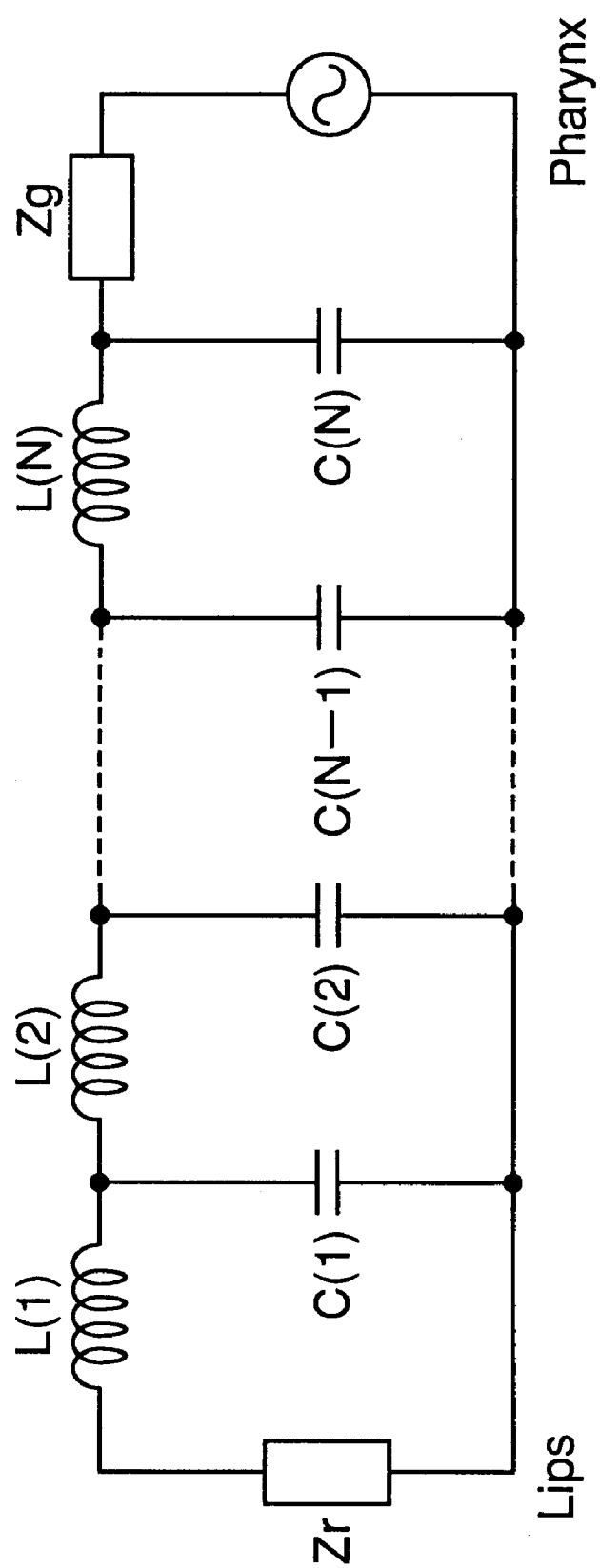
FIG. 11 is a circuit diagram showing an equivalent circuit of a vocal-tract model used in the vocal-tract configuration estimating process by the vocal-tract configuration estimator 10 of FIG. 1.

Also, the radiation impedance Zr of the n-th cross section and the acoustic impedance Zg of the glottis can be represented by the following equation:

$$Zr = \{(j\omega Lr + Rr)/(j\omega LrRr)\} - 1 \qquad (8),$$

where $$Rr = (128\rho c)/\{(3\pi)^2 \cdot A(n)\} \qquad (9),$$

$$Lr = (8\rho c)/\{3\pi\sqrt{\sqrt{A(n)\pi}}\} \qquad (10),$$

and $$Zg = Rg + j\omega Lg \qquad (11),$$

where Rg and Lg are constants. Then, by determining the resonance frequency of the equivalent circuit of FIG. 11 based on these circuit constants, the Formant frequencies of speech generated from the vocal tract model can be calculated (See, for example, Prior Art Document 3, "Digital Signal Processing For Speech (First Half Volume)", translated by Hisaki Suzuki, published by Colonasha on Apr. 15, 1983).

Figure 8A:
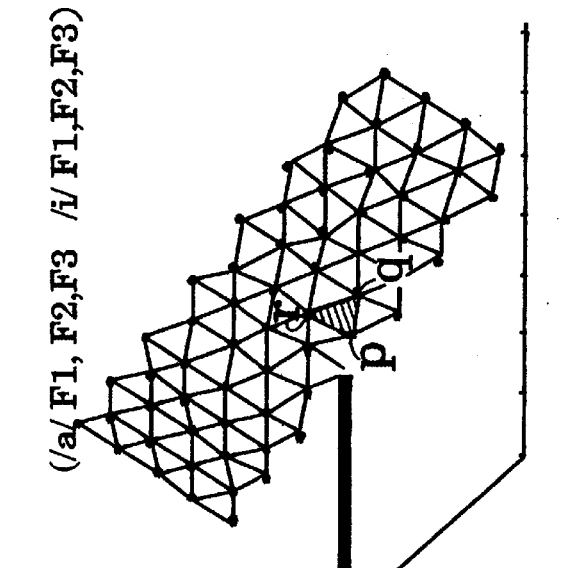
Figure 8B:
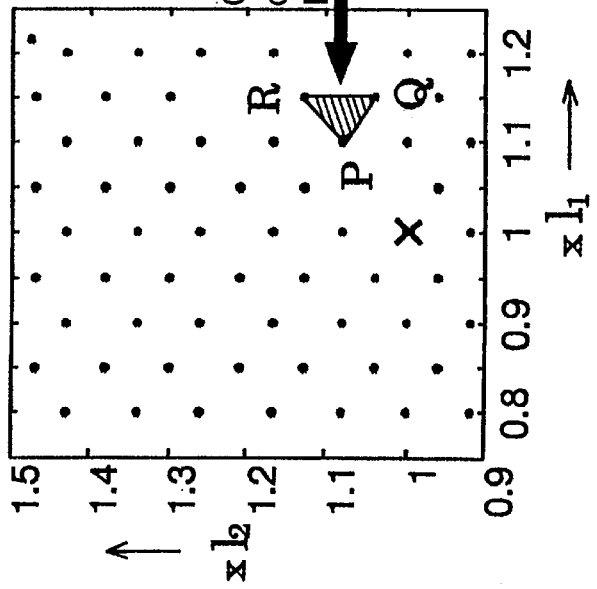
Figure 9B:
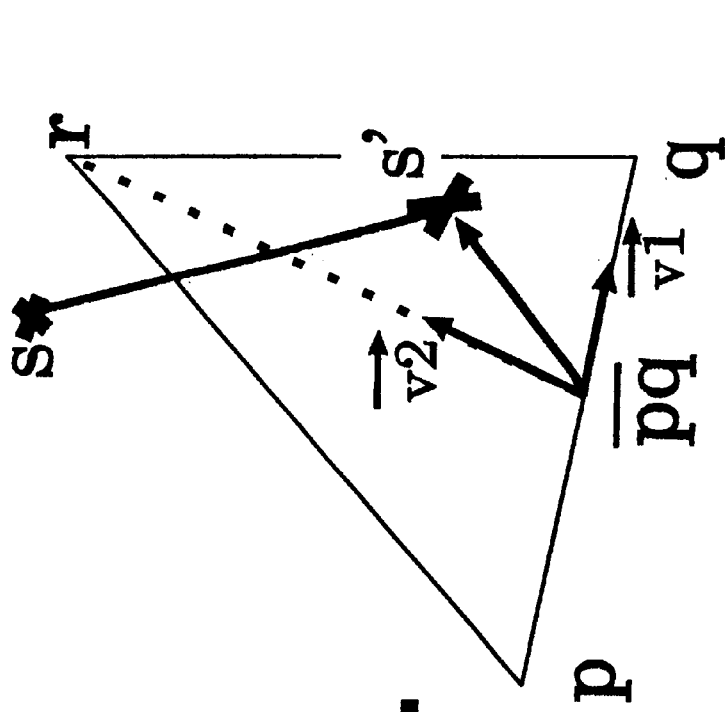
Figure 9A:
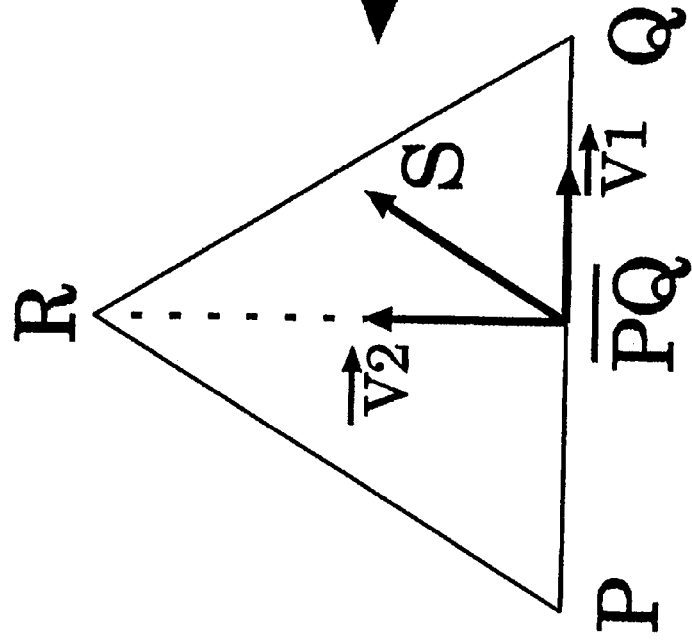

Further, in the present preferred embodiment, by changing the above-mentioned expansion and contraction ratio for the vocal-tract configuration parameters in various ways, expansion and contraction ratios to the vocal-tract configuration parameters of the standard speaker as well as Formant frequencies for the individual vowels corresponding to the expansion and contraction ratios are determined. As a result, as shown in FIGS. 8 and 9, a small plane "PQR" formed by three neighboring or adjacent points on the two-dimensional expansion and contraction ratio space for the vocal-tract configuration parameters, and a small plane "pqr" on the Formant frequency space corresponding to the small plane "PQR" are obtained. In this case, the expansion and contraction ratio space for the vocal-tract configuration parameters can be said also to be a normalization space for the vocal-tract configuration parameters. In addition, referring to FIG. 8B, the Formant frequency space is a space having six dimensions consisting of Formant frequencies $F_{a1}$, $F_{a2}$ and $F_{a3}$ of vowel /a/, and Formant frequencies ($F_{i1}$, $F_{i2}$, $F_{i3}$) of vowel /i/.

The estimation of the vocal-tract configuration parameters is, conversely, executed by mapping from the small plane on the Formant frequency space onto the small plane on the expansion and contraction ratio space for the vocal-tract configuration parameters. The procedure for estimating the vocal-tract configuration parameters is shown below.

FIG. 2 is a flow chart showing a vocal-tract configuration estimating process which is executed by the vocal-tract configuration estimator 10 of FIG. 1. Prior to this estimation process, a space correspondence table between the small plane on the expansion and contraction ratio space for the vocal-tract configuration parameters and the small plane on the Formant frequency space is prepared based on the vocal-tract configuration parameters of the standard speaker previously measured and stored in an internal memory, and then, the space correspondence table is stored in a space correspondence table memory 21. In this space correspondence table, are stored a plurality of sets consisting of parameter sets of the small plane on the expansion and contraction ratio space for the vocal-tract configuration parameters and parameter sets of the small plane on the Formant frequency space. At step S1 of FIG. 2, first of all, the speaker to be speech-recognized utters vowels /a/ and /i/, and then, the uttered speech is inputted to a microphone 1 of FIG. 1, and converted into a speech signal, and then subjected to A/D conversion so as to be converted into a digital speech signal by an A/D converter 2. The digital speech signal is inputted to the vocal-tract configuration estimator 10 via the "b" side of a switch SW1. In response to this, the vocal-tract configuration estimator 10, as shown in FIG. 8, determines a Formant frequency set "s" ($F_{a1}$, $F_{a2}$, $F_{a3}$, $F_{i1}$, $F_{i2}$, $F_{i3}$) of the vowels /a/ and /i/ based on the inputted digital speech signal with respect to the speaker for which the vocal-tract configuration parameters $l_1$ and $l_2$ are to be estimated. Then, at step S2, as shown in FIG. 9, a small plane "pqr" that is the closest to the Formant frequency set "s" determined at step S1 is determined on the Formant frequency space. Further, at step S3, as shown in FIGS. 8 and 9, the Formant frequency set "s'" is determined by projecting the Formant frequency set "s" onto the small plane "pqr" determined at step S2. After this, by looking up to the space correspondence table within the space correspondence table memory 21, the expansion and contraction ratio "S" of the vocal-tract configuration parameters $l_1$ and $l_2$ is determined by a linear function (Equation (13)) on the small plane "PQR" on the corresponding expansion and contraction ratio space for the vocal-tract configuration parameters:

$$s' = \overline{pq} + a_1 \cdot \vec{v}_1 + a_2 \cdot \vec{v}_2 \qquad (12)$$

$$S = \overline{PQ} + A_1 \cdot \vec{V}_1 + A_2 \cdot \vec{V}_2 \qquad (13)$$

$$\begin{bmatrix} a_1/\|q - \overline{pq}\| \\ a_2/\|r - \overline{pq}\| \end{bmatrix} = \begin{bmatrix} A_1/\|Q - \overline{PQ}\| \\ A_2/\|R - \overline{PQ}\| \end{bmatrix} \quad (14)$$

Equation 12 shows that the Formant frequency set "s'" after the projection can be represented by a linear combination of the line segment $\overline{pq}$, the vector $\vec{V}_1$ and the vector $\vec{V}_2$. Equation 13 shows that the Formant frequency set "S" after the conversion can be represented by a linear combination of the line segment $\overline{PQ}$, the vector $\vec{v}_1^*$ and the vector $\vec{v}_2^*$. Equation 14 represents the correspondence between the small plane "pqr" on the Formant frequency space and the small plane "PQR" on the expansion and contraction ratio space for the vocal-tract configuration parameters.

Further, at step S4, the vocal-tract configuration parameters $l_1$ and $l_2$ of the standard speaker are multiplied by the expansion and contraction ratios S for the vocal-tract configuration parameters $l_1$ and $l_2$ determined at step S3, respectively, so that vocal-tract configuration parameters l1 and l2 of the target speaker are obtained, and then, the obtained vocal-tract configuration parameters l1 and l2 are outputted to the frequency warping function generator 11 via the buffer memory 28.

That is, in the present preferred embodiment, feature quantities of a vocal-tract configuration are given by dividing the vocal tract into front (oral cavity side) and rear (pharyngeal cavity side) two sections and taking vocal-tract configuration parameters of their respective lengths $l_1$ and $l_2$. The vocal-tract configuration parameters are estimated by a simple method of mapping from the Formant frequency space to the vocal-tract configuration parameter space based on the Formant frequencies (F1, F2, F3) of two vowels /a/ and /i/ of each speaker. Mapping functions necessary for the estimation are prepared using a vocal tract model prepared based on X-ray photographs of a standard speaker. Also, the speaker normalization is implemented by performing frequency warping in such a manner that speech of a normalization-target speaker is approximated to the speech of the standard speaker. The frequency warping function used for the normalization is prepared by the procedure shown below based on the vocal tract model of the standard speaker and the vocal-tract configuration parameters of each speaker. In the present preferred embodiment, the normalization-target speaker is a training speaker.

Figure 19:
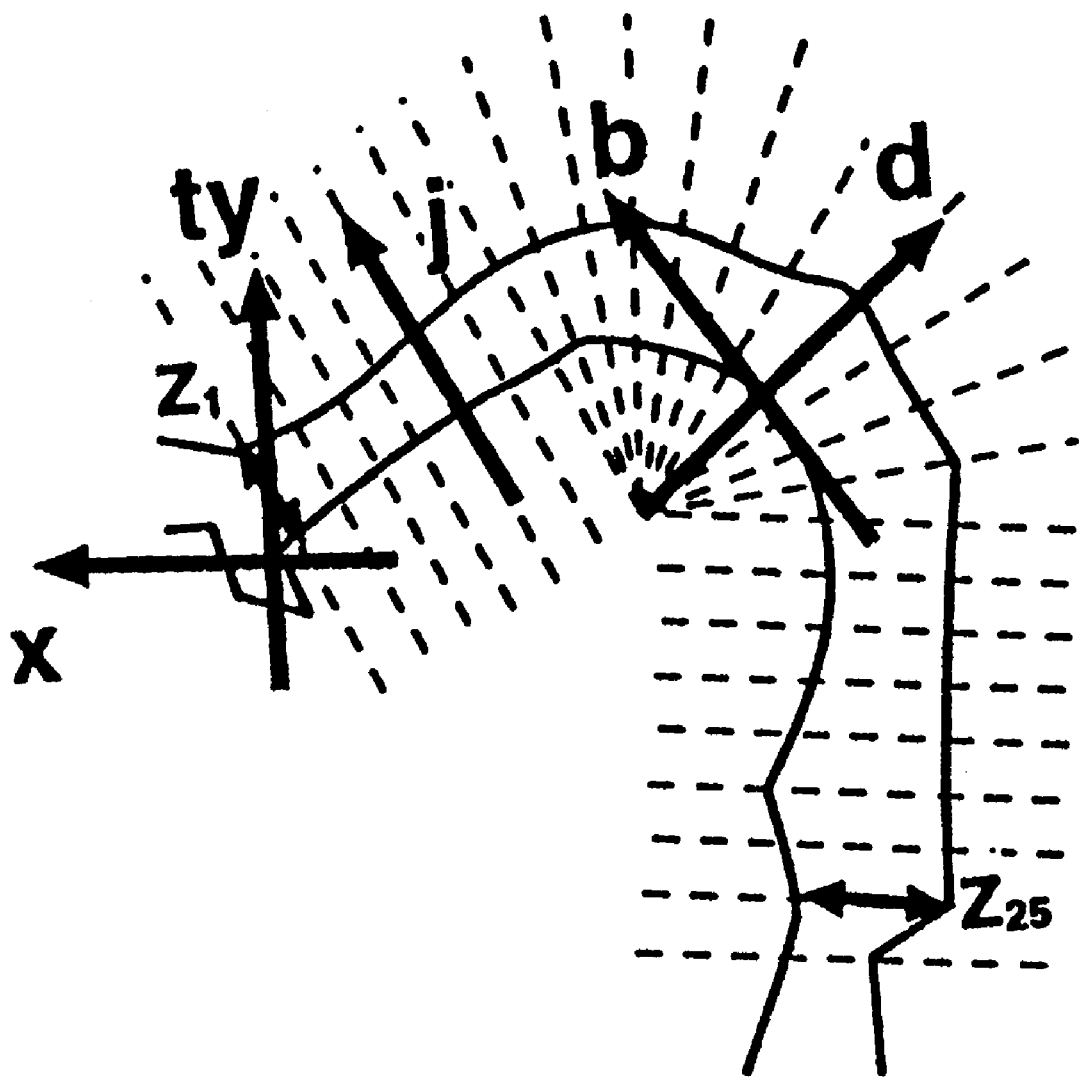
FIG. 19 is a view showing a modified Maeda model of the vocal-tract configuration which can-be used in preferred embodiments of the present invention.

(C1) A vocal-tract area function of the standard speaker which is used for the generation of a frequency warping function is determined. In the present preferred embodiment, one frequency warping function independent of phonemes is estimated for each speaker, and a modified Maeda model shown in FIG. 19 is used. In this model, five parameters of a parameter j for controlling the position of the jaw, parameters b, d for controlling the position of the tongue and parameters $t_x$ and $t_y$ for controlling the position of the lips are controlled independently of one another in accordance with speech to be uttered, by which vocal-tract cross-sectional area parameters $z_1, \ldots, z_{25}$ of individual points of the vocal tract corresponding to the speech to be uttered are obtained. By adjusting these parameters and estimating vocal-tract cross-sectional area parameters corresponding to individual phoneme contexts or environments, and based on these vocal-tract cross-sectional area parameters, the frequency warping function is estimated.

As this vocal-tract area function, although a vocal-tract area function corresponding to a specific phoneme may be used, yet an intermediate vocal-tract area function independent of any specific phoneme is preferably used. For example, using an articulatory model of the vocal tract, a basic frequency warping function is modified according to a plurality of parameters for controlling the position of the tongue, the position of the jaw and the like responsive to phonemes, by which a vocal-tract area function corresponding to each phoneme is estimated. Setting these parameters for controlling the articulatory model all to zero, an intermediate vocal-tract area function of the standard speaker independent of any particular phoneme can be determined.

(C2) With respect to the vocal-tract area function of the standard speaker determined by (C1), Formant frequencies to around the Nyquist frequency is determined. For example, when the sampling frequency is 12 kHz, Formant frequencies of up to around a 6 kHz Nyquist frequency are determined.

(C3) The vocal tract model of the standard speaker determined by (C1) is expanded and contracted according to the vocal-tract configuration parameters $l_1$ and $l_2$ of the normalization-target speaker, by which a vocal tract model of the normalization-target speaker is prepared. This vocal tract model is prepared for the oral-cavity side and pharyngeal-cavity side two sections of the vocal tract, independently of each other, by stretching or shrinking the vocal tract model according to the standard speaker to normalization-target speaker ratio of $l_1$ in the case of the front of the vocal tract, and according to the standard speaker to normalization-target speaker ratio of $l_2$ in the case of rear of the vocal tract.

(C4) Formant frequencies (F1 to F7) for the vocal-tract area function of the standard speaker determined by (C3) are determined.

(C5) Since a correspondence relationship of Formant frequencies between the standard speaker and the normalization-target speaker is obtained by the processes of above (C2) and (C4), a frequency warping function is generated in such a way that Formant frequencies of speech of each training speaker are changed to their corresponding Formant frequencies of the standard speaker by frequency warping. In this process, for a section of frequency 0 Hz to Formant frequency F1, an approximation is performed by a straight line that passes through two points (frequency 0 Hz, frequency 0 Hz) and (F1 of normalization-target speaker, F1 of standard speaker). After this, similarly, for sections between Formant frequencies Fn−1 and Fn (n=2, 3, . . . , 7), approximations are performed by lines that pass two points (Fn−1 of normalization-target speaker, Fn−1 of standard speaker) and (Fn of normalization-target speaker, Fn of standard speaker), by which the frequency warping function is determined.

Figure 14:
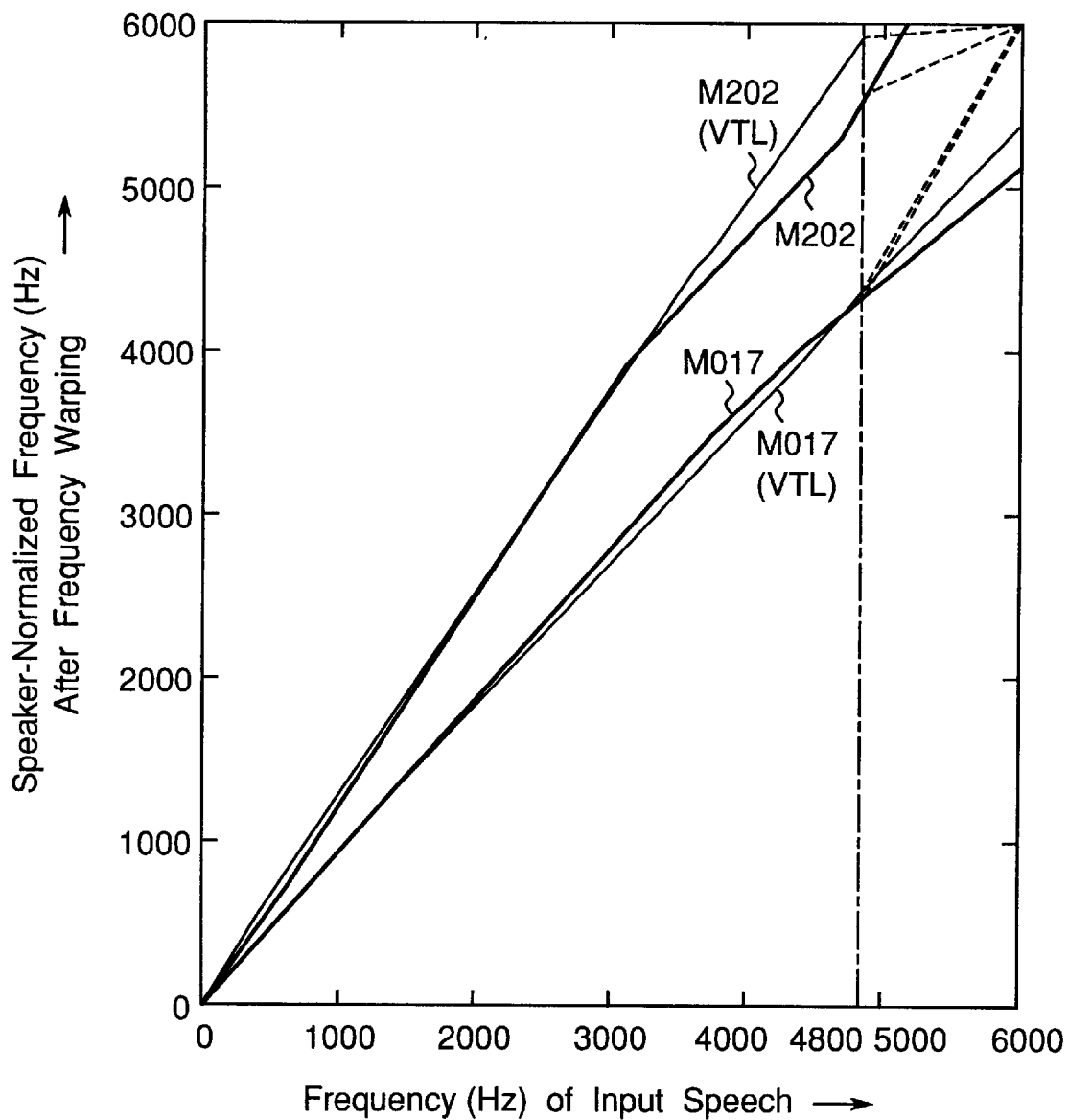
FIG. 14 is a graph which shows examples of frequency warping functions used in the speech recognition apparatus of FIG. 1 and which is a graph of speaker-normalized frequency after frequency warping versus the frequency of input speech.

As an example of the frequency warping function, frequency warping functions for normalization-target speakers (two speakers, speaker's name: M202 and M017), which were prepared by using the above method, are shown in FIG. 14. In FIG. 14, frequency warping functions (speaker's name (VTL)) prepared based on vocal tract length are given for comparison. This frequency warping function based on vocal tract length linearly expands and contracts the frequency axis according to the ratio of standard speaker's vocal tract length $VTL_{ref}$ to normalization-target speaker's $VTL_{target}$ by the following equation:

$$f'=f\times(VTL_{target}/VTL_{ref}) \quad (15).$$

where f is the frequency before normalization and f' is the frequency after normalization corresponding to the frequency f. In addition, for lateral-described experiments, speech data sampled at a sampling frequency of 12 kHz are used. When the normalization is performed using the above frequency warping function, it is necessary for the speech data before normalization to have information on frequency ranges over 6 kHz in order that spectra for the entire frequency range of 6 kHz can be obtained even after the normalization also in the case of:

$$VTL_{target}/VTL_{ref} < 1. \tag{16}$$

For avoiding this problem, in the present preferred embodiment, the above frequency warping function is used for frequency ranges of 80% Nyquist frequency (4.8 kHz) or lower, and for higher frequency ranges, the frequency warping function is modified by linear interpolation so that frequencies before and after the frequency warping coincide with each other at the Nyquist frequency (6 kHz) (See broken lines shown in FIG. 14).

In the speech recognition apparatus of FIG. 1, a standard-speaker Formant frequency memory 26 is a memory for storing Formant frequencies of the standard speaker that are required in the frequency warping function generator 11 and the speaker normalization processor 12. This is a memory for storing Formant frequencies previously calculated by the vocal-tract configuration estimator 10 and the frequency warping function generator 11 (later-described processing of FIG. 3) based on a standard speaker's vocal tract model (same as the model used in the frequency warping function generator 11 and the speaker normalization processor 12, including the vocal-tract area function) obtained by plotting the vocal-tract configuration, as in the above-mentioned vocal-tract configuration model, based on X-ray photographs or CT photographs of sections of the standard speaker's vocal tract. In the present preferred embodiment, the standard-speaker Formant frequency memory 26 stores, for example, the first to seventh Formant frequencies F1, F2, . . . , F7.

FIG. 3 is a flow chart showing a frequency warping function generating process which is executed by the frequency warping function generator 11 of FIG. 1. This frequency warping function generating process is a process for generating a frequency warping function of a speech-recognition speaker based on vocal-tract parameters of the standard speaker and each speech-recognition speaker to be inputted from the vocal-tract configuration estimator 10 via the buffer memory 28, and the Formant frequencies of the standard speaker stored in the standard-speaker Formant frequency memory 26, and then storing the generated frequency warping function into the frequency warping function memory 27.

Figure 12:
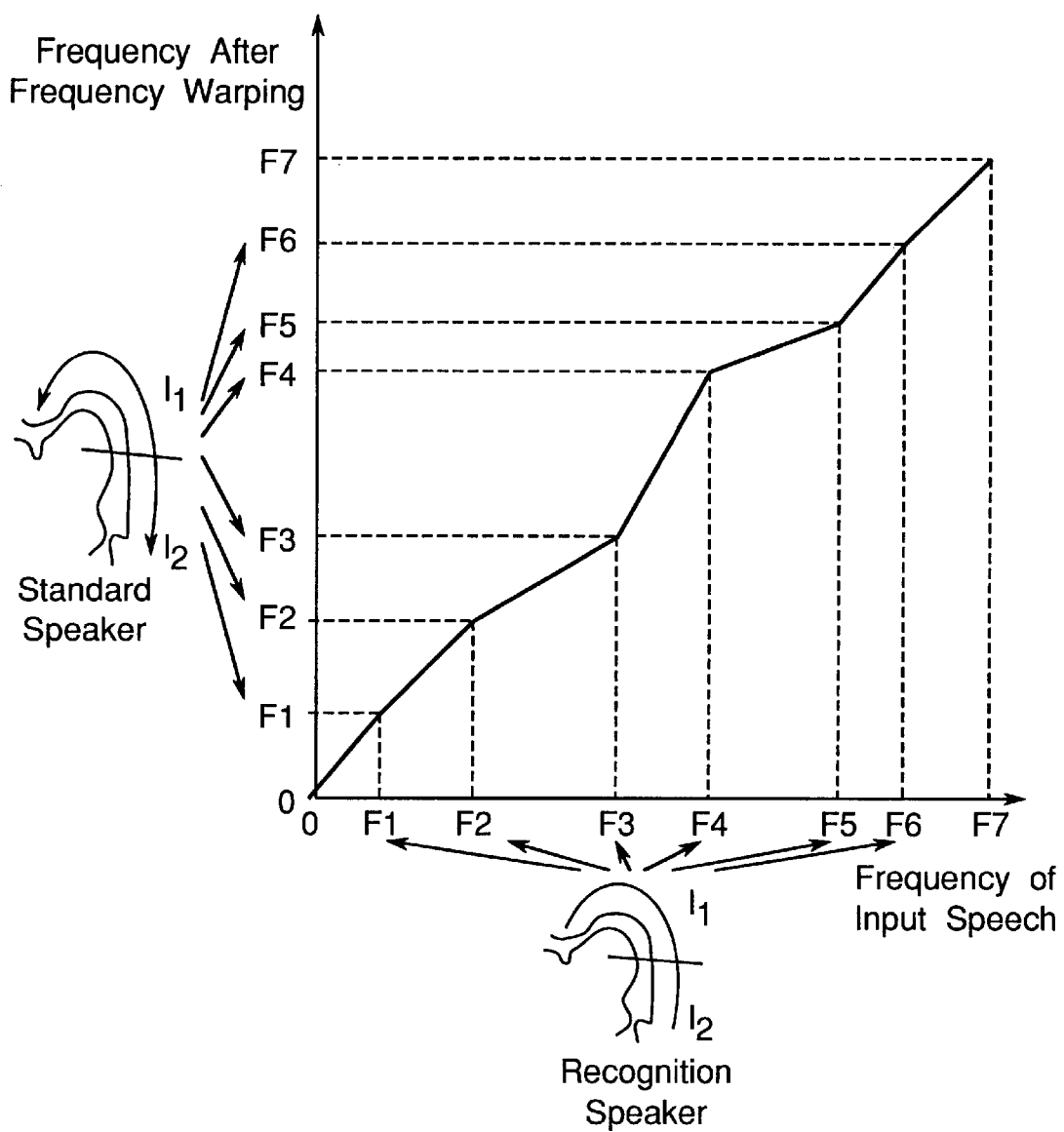
FIG. 12 is a graph of frequency after frequency warping on the frequency of input speech, showing a method for estimating a frequency warping function using a vocal tract model used in a frequency warping function generator 11 of FIG. 1.

In this frequency warping function generating process, the vocal tract model of the standard speaker is stretched or shrunk by using the vocal-tract configuration parameters $l_1$ and $l_2$ estimated for each speaker in the vocal-tract configuration estimator 10, so that the vocal tract model of each speaker is approximated. From this model, the Formant frequencies of outputted speech are estimated. In this estimation, although adjusting the vocal tract model of the standard speaker vocal-tract configurations and Formant frequencies corresponding to various phonemes can be obtained by adjusting the vocal tract model of the standard speaker, yet it is preferable here to use an intermediate vocal-tract configuration independent of phonemes. In a manner similar to above manner, the Formant frequencies of outputted speech are obtained from the vocal tract model of the standard speaker, and then, stored into the standard-speaker Formant frequency memory 26. Then, from the relationship between the Formant frequencies of the normalization-target speaker and the Formant frequencies of the standard speaker, a frequency warping function as shown in FIG. 12 is estimated.

Referring to FIG. 3, first of all, the Formant frequencies of speech uttered by the standard speaker are estimated by the above-mentioned method based on the vocal-tract area function of the standard speaker, and then, are stored into the standard-speaker Formant frequency memory 26. Subsequently, at step S12, the vocal-tract configuration parameters $l_1$ and $l_2$ of the standard speaker are changed based on the vocal-tract configuration parameters $l_1$ and $l_2$ of individual speech-recognition speakers estimated by the vocal-tract configuration estimator 10 as well as the vocal-tract configuration parameters $l_1$ and $l_2$ of the standard speaker, by which vocal-tract area functions of the individual speech-recognition speakers are estimated. Based on these results, Formant frequencies of individual phonemes of the speech uttered by each speech-recognition speaker are estimated by the same method as in step S11. Further, at step S13, from the correspondence relation between the Formant frequencies of the standard speaker stored in the standard-speaker Formant frequency memory 26 and the Formant frequencies of each speech-recognition speaker obtained at step S12, a frequency warping function is generated and stored into the frequency warping function memory 27.

Now, referring to FIG. 12, the method for generating the frequency warping function will be explained. For generating the frequency warping function, a correspondence relation between frequencies for changing inputted speech frequencies is determined by the frequency warping process so that post-processing Formant frequencies of speech of each speech-recognition speaker respectively coincide with the corresponding Formant frequencies of the standard speaker, i.e., so that the Formant frequencies (F1–F7) of speech of each speech-recognition speaker are converted into corresponding Formant frequencies (F1–F7) of the standard speaker. Then, as shown in FIG. 12, for the range of frequency 0 to Formant frequency F1, two points (frequency 0 Hz, frequency 0 Hz) and (F1 of speech-recognition speaker, F1 of standard speaker) are approximated by a straight line. After that, similarly, for the range between the Formant frequencies Fn−1 and Fn, approximation is performed by a straight line that passes the two points (Fn−1 of speech-recognition speaker, Fn−1 of standard speaker) and (Fn of speech-recognition speaker, Fn of standard speaker), by which the frequency warping function is determined. In other words, a frequency warping function is obtained so that the Formant frequencies of the speech-recognition speaker correspond to the frequencies of input speech, while the Formant frequencies of the standard speaker become the frequencies after frequency warping.

Figure 4:
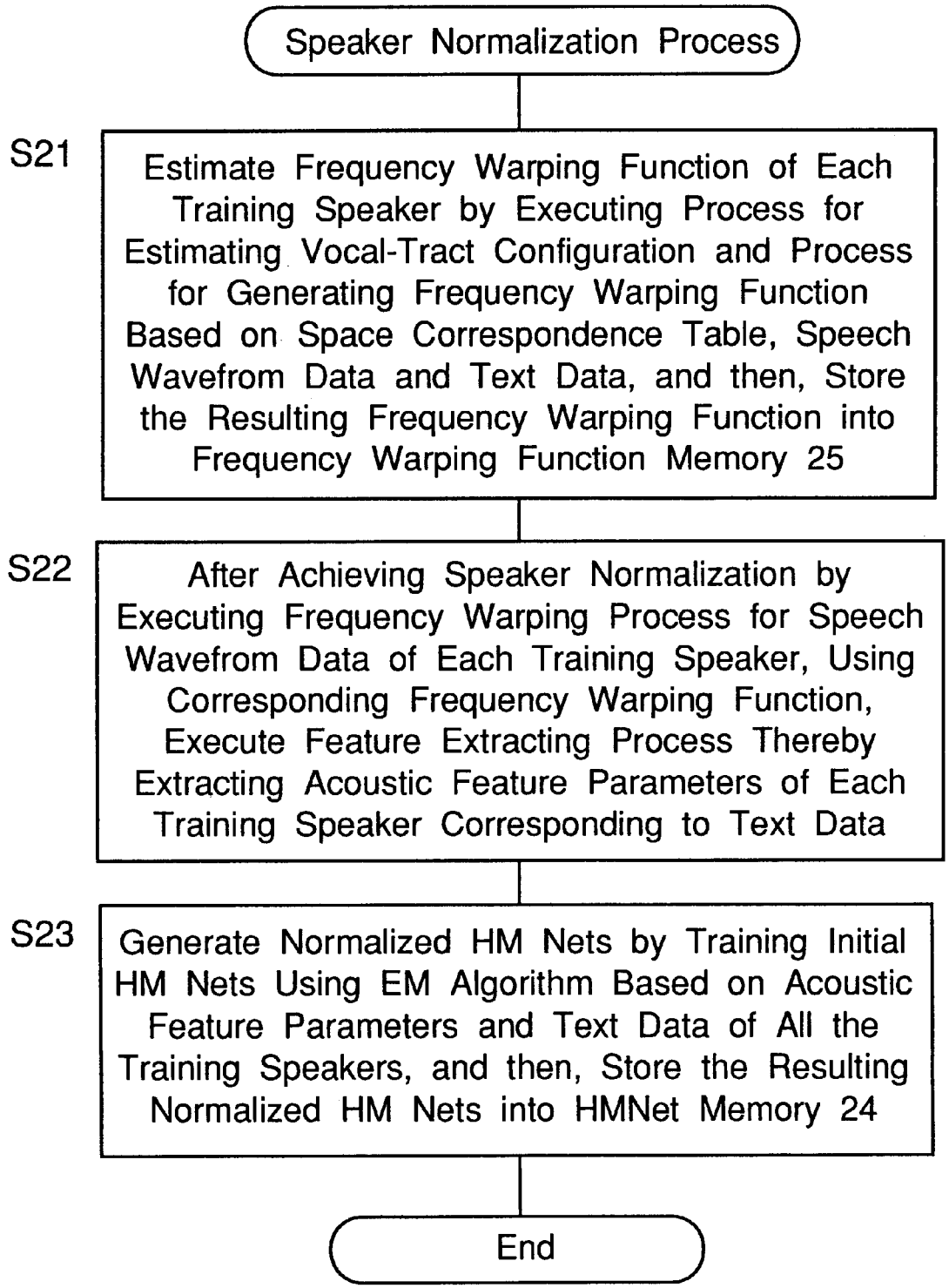
FIG. 4 is a flow chart showing a speaker normalizing process which is executed by a speaker normalization processor 12 of FIG. 1.

FIG. 4 is a flow chart showing a speaker normalizing process which is executed by the speaker normalization processor 12 of FIG. 1.

Referring to FIG. 4, first of all, at step S21, a vocal-tract configuration estimating process similar to the process of the vocal-tract configuration estimator 10, as well as a frequency warping function generating process similar to the process of the frequency warping function generator 11 are executed based on the space correspondence table stored in the space correspondence table memory 21, the speech waveform data of a plurality of training speakers stored in a speech waveform data memory 22, and text data stored in a text data memory 23 in correspondence to the speech waveform data, by which frequency warping functions of the individual training speakers are estimated and stored into a frequency warping function memory 25.

Next, at step S22, the speech waveform data of the individual training speakers stored in the speech waveform data memory 22 are speaker-normalized by executing the frequency warping process using a corresponding frequency warping function (stored in the frequency warping function memory 25), and after that, a feature extracting process (which is a process similar to later-described process by the feature extractor 3) is performed on the speaker-normalized speech waveform data, by which acoustic feature parameters of the individual training speakers corresponding to the text data are extracted. Further, at step S23, based on the acoustic feature parameters of all the training speakers and the text data stored in the text data memory 23, normalized HMNets are generated by training initial HMNets stored in an initial HMNet memory 29 using an EM (Estimation maximum) algorithm, which have been known to those skilled in the art, so that the probability at which the acoustic parameter train used for the training becomes a maximum, and then, the resulting normalized HMNets are stored into an HMNet memory 24.

That is, in the speaker normalizing process by the speaker normalization processor 12, with respect to speech waveform data of the individual training speakers (which are data resulting from digitizing the speech and which are speech digital data before frequency warping process), the speaker normalization is performed and then the training of acoustic models is performed. Preferably, different two speech data sets of speech waveform data for the generation of frequency warping functions and speech waveform data for adaptation or training are used for the training.

Figure 13A:
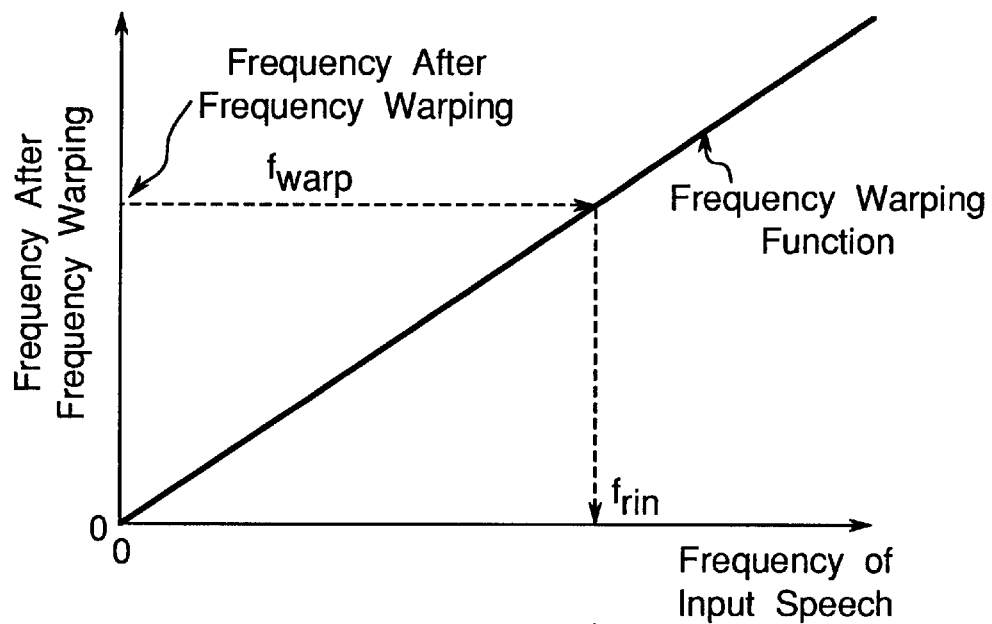
Figure 13B:
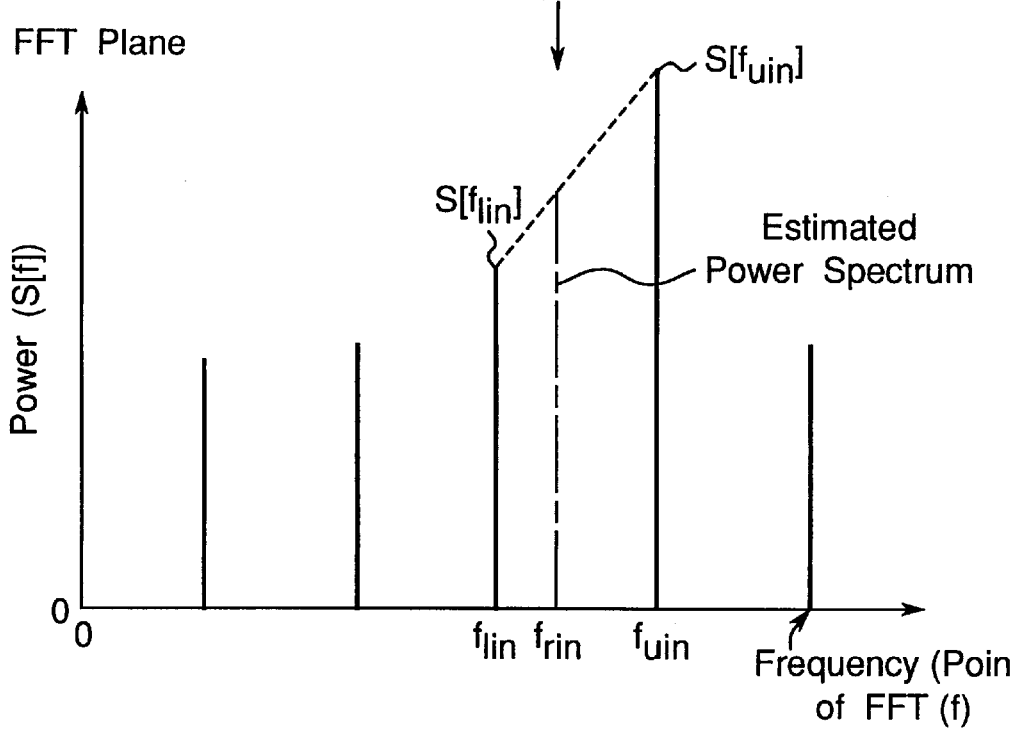

In more detail, the feature extractor 3 executes frequency warping using a frequency warping function, and then, extracts acoustic feature quantities such as mel-frequency cepstrum coefficients (MFCCs). In this case, the frequency warping is implemented by replacing the value of the power of each frequency after the frequency warping with a power of its corresponding frequency on an input speech spectrum according to the frequency warping function. In the present preferred embodiment, the MFCC is used as an acoustic feature parameter, in which case an input speech power spectrum is calculated using FFTs in the MFCC calculation process. This power spectrum is determined in a discrete manner in the direction of frequency, and therefore in most cases frequency powers before frequency warping which correspond to individual frequencies after the frequency warping have not yet been calculated, so that the power spectrum after the frequency warping cannot be determined directly. For this reason, in the present preferred embodiment, the frequency warping is implemented by approximating the powers of the individual frequencies after the frequency warping by means of linear interpolation based on the power of the individual frequencies of the input speech (See FIG. 13).

Figure 5:
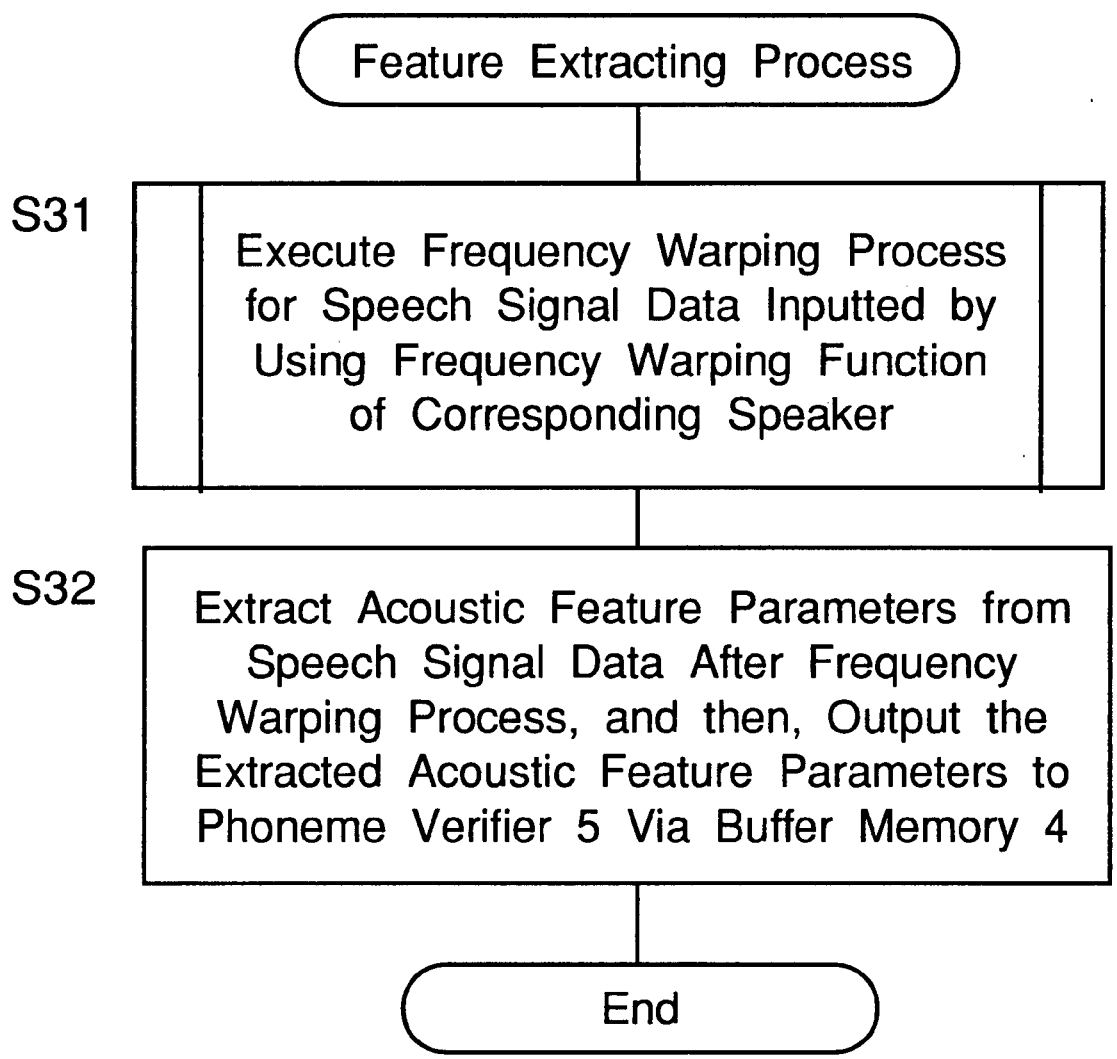
FIG. 5 is a flow chart showing a feature extracting process which is executed by a feature extractor 3 of FIG. 1.

FIG. 5 is a flow chart showing a feature extracting process which is executed by the feature extractor 3 of FIG. 1.

Referring to FIG. 5, at step S31, the frequency warping process is executed for speech signal data inputted by using the frequency warping function of speech-recognition speakers stored in the frequency warping function memory 27. Then, at step S32, acoustic feature parameters are extracted from the speech signal data after frequency warping process, and then outputted to the phoneme verifier 5 via the buffer memory 4.

FIG. 6 is a flow chart showing a frequency warping process (step S31), which is a subroutine of FIG. 5. This process will be explained below with reference to FIG. 13.

Referring to FIG. 6, first of all, at step S41, power spectra $S[f_{in}]$ ($f_{in}=1, 2, 3, \ldots, N$) of speech signal data inputted by FFT from the A/D converter 2 via a switch SW1 (where N is the number of points of FFT). Then, after the frequency point parameter $f_{warp}$ is set to one at step S42, a frequency $f_{rin}$ (real number) of input speech data corresponding to the frequency $f_{warp}$ is determined by using a corresponding frequency warping function stored in the frequency warping function memory 27 at step S43. Then, at step S44, frequencies $f_{lin}$ (low frequency side) and $f_{uin}$ (high frequency side) of FFT adjacent to the frequency $f_{rin}$ are determined, where the frequency of FFT is a frequency at which the frequency point of the FFT is present. Further, a power at frequency $f_{rin}$ of input speech is approximately calculated by performing linear interpolation of the power at $f_{lin}$ and $f_{uin}$ of input speech using the following equation, and then, the calculated power is outputted as power $S'[f_{warp}]$ at the frequency $f_{warp}$ of the FFT after frequency warping:

$$S'[f_{warp}]=S[f_{lin}]+\{(f_{rin}-f_{lin})/(f_{uin}-f_{lin})\}(S[f_{uin}]-S[f_{lin}]) \quad (17).$$

Next, at step S46, it is decided whether or not $f_{warp} \geq N$. If NO at step S46, the process has not yet been completed, the frequency point parameter $f_{warp}$ is incremented by one at step S47, then the program flow returns to step S43. On the other hand, if YES at step S46, then the program flow returns to the main routine.

Furthermore, processing by the phoneme verifier 5 and the LR parser 6, that is, a speaker independent speech recognition method using speaker normalization models according to the present preferred embodiment is described. In the present preferred embodiment, (D1) Next, with the switch SW1 switched over to the "b" side, a speech-recognition speaker is asked to utter speech necessary for the estimation of feature quantities of the vocal-tract configuration. Then, based on the speech uttered via the microphone 1, processes of steps S12 and S13 of the vocal-tract configuration estimator 10 and the frequency warping function generator 11 are executed; and (D2) Then, with the switch SW1 switched over to the (a) side, the speech-recognition speaker is asked to utter speech to be recognized, and then the speech recognition is executed.

Therefore, for each speech-recognition speaker, the processes of above (D1) and (D2) are executed.

Next, an SSS-LR (left-to-right rightmost type) speaker-independent continuous speech recognition apparatus in this embodiment is described. This apparatus uses a high-efficiency phoneme context dependent HMM representation form, which is so called HMNet, stored in the HMNet memory 24. Also, in the SSS, for a probability model representing a time-base transition of speech parameters by probabilistic transition between probabilistic stationary signal sources (states) assigned on the phoneme feature space, the operation of dividing each state in the context or time direction based on the criterion of likelihood maximization is repeated, by which model refinement is sequentially executed.

In the speech recognition process of the speech recognition apparatus of FIG. 1, uttered speech of a speaker is inputted to the microphone 1 and converted into a speech signal, and then, the speech signal is subjected to A/D conversion so as to be converted into a digital speech signal by the A/D converter 2. The digital speech signal is inputted to the feature extractor 3 via the "a" side of the switch SW1. The feature extractor 3, after executing speaker normalization on the inputted digital speech signal using a corresponding frequency warping function (stored in the frequency warping function memory 27) as described above, extracts acoustic feature parameters including a log power, a Δlog power, a 12-order mel-frequency cepstrum coefficients (MFCC) and a 12-order Δ mel-frequency cepstrum coefficients (ΔMFCC). A time series of the extracted feature parameters is inputted to the phoneme verifier 5 via the feature extractor 7.

The HMNet stored in the HMNet memory 24 connected to the phoneme verifier 5 is represented as a plurality of networks taking each state as a node, and each state has the following information:

(a) state number;

(b) acceptable context class;

(c) preceding-state and succeeding-state list;

(d) parameter of output probability density distribution; and (e) self transition probability and succeeding-state transition probability.

It is noted that the HMNet used in the present preferred embodiment is generated by transforming a predetermined speaker-mixed HMNet because each distribution needs to be identified as to which speaker the distribution is derived from. The output probability density function in this case is a mixed Gaussian distribution having a 26-dimensional diagonal covariance matrix, and each distribution has been trained by using samples of a specific speaker. Also, a predetermined context-free grammar (CFG) stored in the context-free grammar memory (CFG memory) 9 is automatically transformed into an LR table by a publicly known method and stored in an LR table memory 8.

Then, in the speech recognition process, the phoneme verifier 5 executes a phoneme verifying process in response to a phoneme verification request from the phoneme-context dependent type LR parser 6. In this process, the LR parser 6 delivers to the phoneme verifier 5 phoneme context information comprising a phoneme verification section, a verification-target phoneme and its preceding and succeeding phonemes. Based on the delivered phoneme context information, the phoneme verifier 5 calculates the likelihood for data within the phoneme verification section by using the designated speaker model, and then, this likelihood value is returned to the LR parser 6 as a phoneme verification score. In response to this, the LR parser 6 processes the inputted phoneme prediction data from left to right without turning back, with a lookup to the LR table stored in the LR table memory 8. If there is a syntactic ambiguity, analyses for all the candidates are processed in parallel with the stack split. The LR parser 6 predicts the next-coming phoneme from the LR table, and then, outputs the phoneme prediction data to the phoneme verifier 5. In response to this, the phoneme verifier 5 makes a verification with a lookup to the information stored in the HMNet memory 24 related to the designated speaker model corresponding to the phoneme, returns its likelihood to the LR parser 6 as a phoneme recognition score, thereby concatenating the phonemes one after another and achieving the continuous speech recognition. In this process, if a plurality of phonemes are predicted, all of these are checked for their presence, where high-speed processing is achieved by performing a pruning that partial trees of high partial speech recognition likelihoods are left by a beam search method. After the inputted speaker speech has completely been processed, one having the maximum total likelihood or ones of a predetermined plurality of highest orders are outputted to external equipment as recognition result data of the apparatus.

In the above-described embodiment, the feature extractor 3, the phoneme verifier 5, the LR parser 6, the vocal-tract configuration estimator 10, the frequency warping function generator 11 and the speaker normalization processor 12 are implemented by, for example, a digital computer. The buffer memory 4 and the space correspondence table memory 21, the speech waveform data memory 22, the text data memory 23, the HMNet memory 24, the frequency warping function memory 25, the standard-speaker Formant frequency memory 26, the frequency warping function memory 27, the buffer memory 28, the initial HMNet memory 29, the LR table memory 8 and the CFG memory 9 are implemented by, for example, storage device such as a hard disk memory.

As described above, according to the present preferred embodiment, since a frequency warping function feature can be generated from quantities of the vocal-tract configuration extracted from Formant frequencies of two vowels and the speech generating model, it becomes possible to achieve speaker normalization based on a small quantity of speech data. Also, since it is unnecessary to specify the configuration of the frequency warping function in advance as would be involved in the frequency warping function selection method based on the likelihood (prior art example), a more detailed frequency warping function can be generated. Therefore, using frequency warping functions generated based on the method of the present preferred embodiment makes it possible to achieve high-speed, high-performance speaker adaptation. Further, in the speech recognition process, speech recognition is performed by using an HMM which has been obtained by speaker-normalizing speech signal data to be recognized using a corresponding frequency warping function and then performing feature extraction, speaker normalization and training. Therefore, speech recognition can be achieved with a speech recognition rate higher than that of the prior art.

EXPERIMENTAL EXAMPLES

The present inventor performed recognition experiments by phoneme type writer in order to ascertain the functional effects of the above described speech recognition apparatus. Experimental conditions are shown in Table 1:

Table 1

Acoustic Analysis

Sampling frequency: 12 kHz,

Pre-emphasis: 0.98,

Frame period: 10 ms,

Frame length: 20 ms (hamming window)

Feature parameters: log power, Δlog power, 12-order MFCC, 12-order ΔMFCC (filter bank power 16)

Constitution of Acoustic Model (HMNet):

Speech: totally 800 states, 1 mixture (by ML-SSS method)

No speech: 3 states, 10 mixtures

Training Data 148 males, phoneme balance sentences A (50 sentences) of Database which the present applicant have Evaluation Data 10 males, phoneme balance sentences B (50 sentences)

Evaluation Data of vocal-tract configuration in training/ evaluation

Long vowels in two words within the phoneme balance sentence A set

"y-u-u-z-a̱-a", "f-a-m-i-r-i̱-i̱"

In the present experiment, for comparison, recognition was performed by using four types of acoustic models of:

(E1) male models (GD);

(E2) speaker adaptation models (VFS) by the mobile vector field smoothing method (VFS method) (See, for example, Prior Art Document 4, Kazumi Okura et al., "mobile vector field smoothing speaker adaptive method using mixed continuous distribution HMM", a technical report of the Institute of Electronics, Information and Communication Engineers, SP92-16, June 1992);

(E3) speaker normalization model (VTL) based on vocal tract length; and (E4) speaker normalization models ($l_1, l_2$) based on vocal-tract configuration parameters $l_1$ and $l_2$.

In this case, the male models are models trained by an EM (Estimation-Maximum) algorithm which have been skilled in the art by using speech data of 138 speakers in Table 1. In the speaker normalization based on the vocal-tract configuration parameters $l_1$ and $l_2$, training and recognition of models were performed by using the frequency warping function from normalization-target speaker to standard speaker generated by the above method, and by precedently performing the speaker normalization for each speaker. Also as to the speaker normalization based on the vocal tract length, training and recognition of models were performed similarly by precedently performing the speaker normalization for each speaker by means of the above-mentioned linear transformation. The speaker clustering models were models trained based on results of splitting into 5 clusters by using the Euclidean distance between the vocal-tract configuration parameters ($l_1, l_2$). It is noted that the selection of speaker clusters in recognition was performed also based on the vocal-tract configuration parameters $l_1$ and $l_2$. Further, for the speaker adaptation models by VFS, speaker adaptation was performed by executing smoothing control and by using several types of adaptation sentences. In addition, for the (E2)–(E4) models, male models (E3) were taken as initial models and the training of models were performed by preparatorily exerting control so that the variance of each normal distribution after training does not become smaller than before training.

Figure 15:
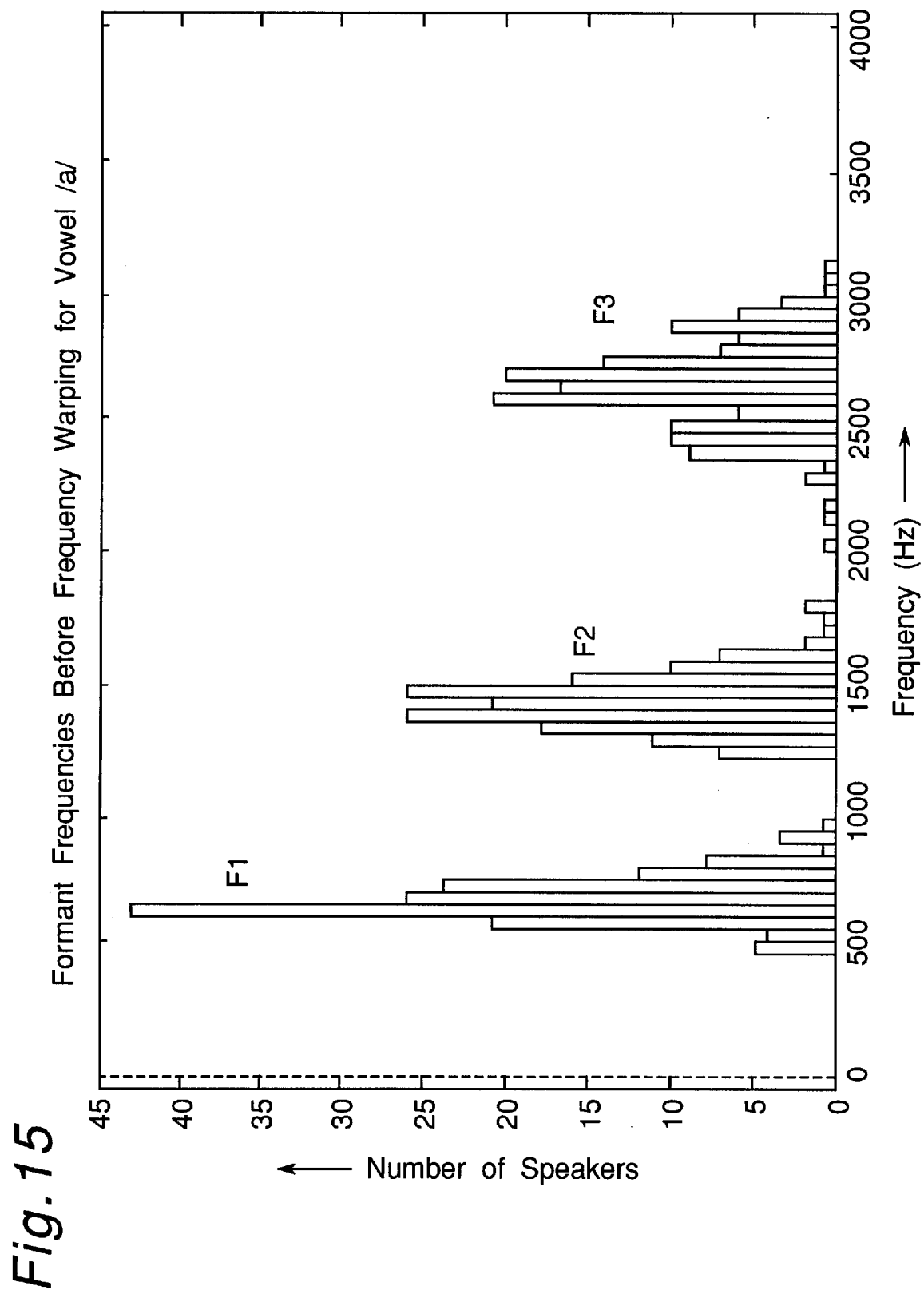
FIG. 15 is a graph which is an experiment result of the speech recognition apparatus of FIG. 1 and which shows a distribution of the number of speakers dependent on Formant frequencies before frequency warping for vowel /a/.
Figure 16:
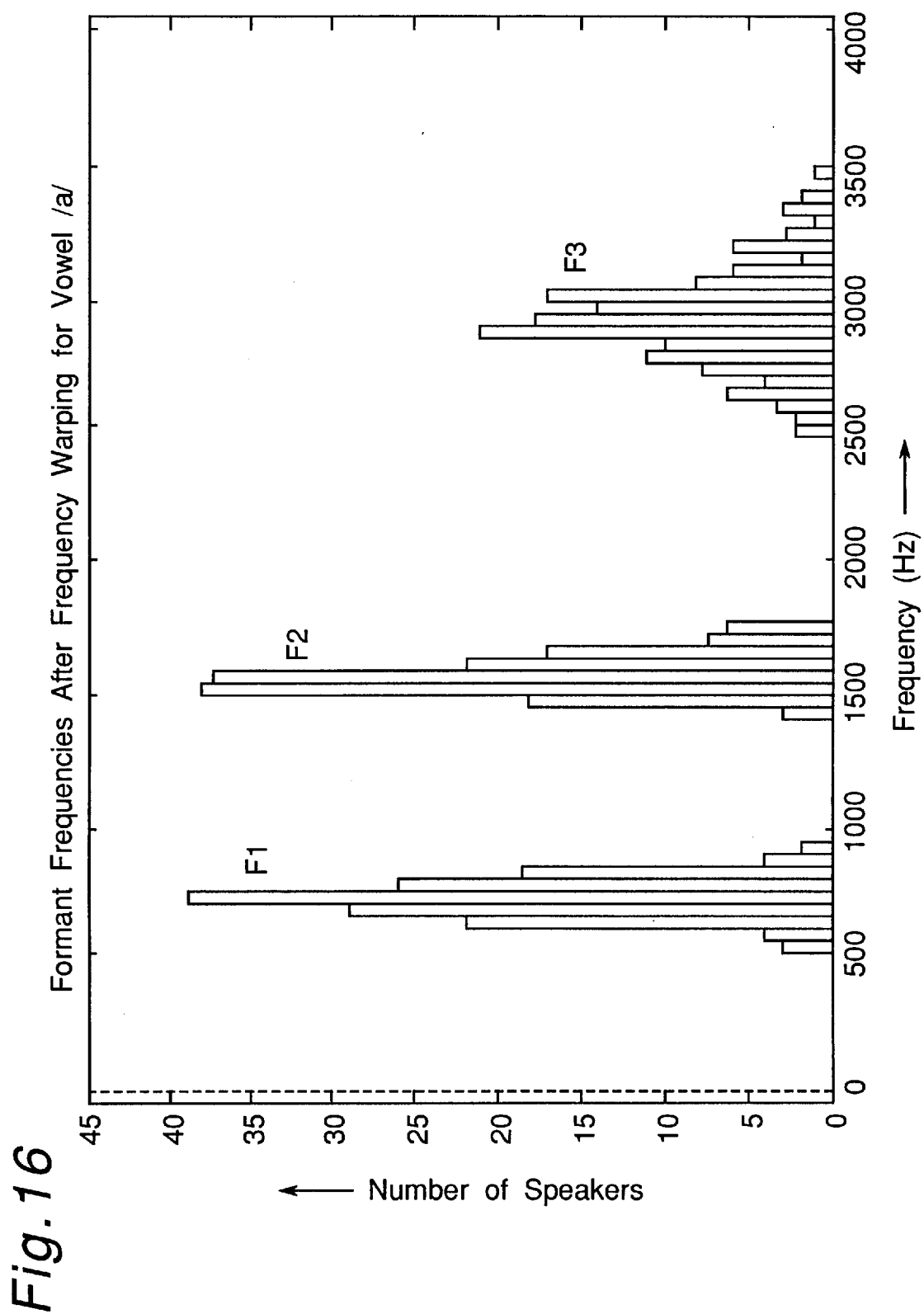
FIG. 16 is a graph which is an experiment result of the speech recognition apparatus of FIG. 1 and which shows a distribution of the number of speakers dependent on Formant frequencies after frequency warping for vowel /a/.
Figure 17:
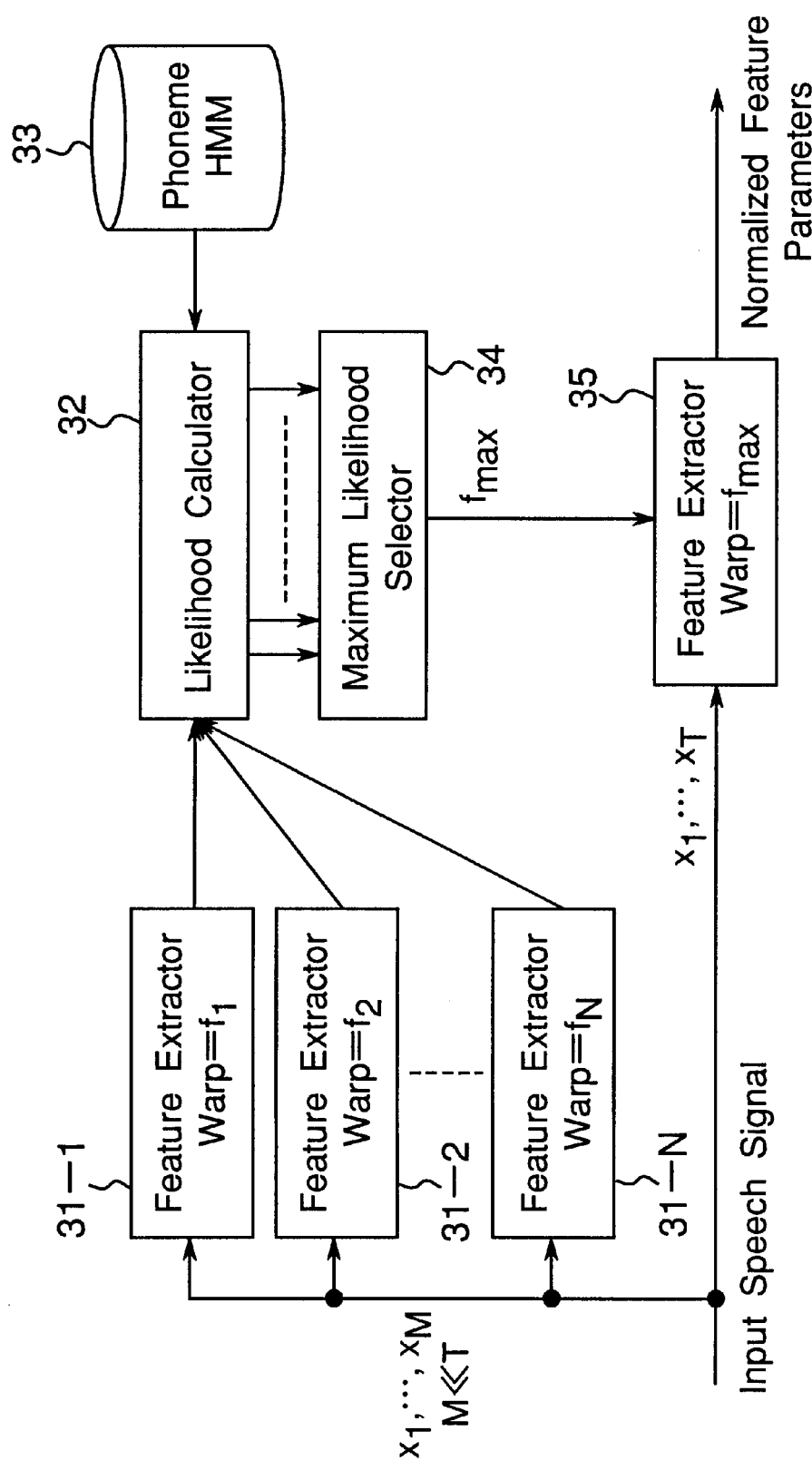
FIG. 17 is a block diagram showing a constitution of a speaker normalization processor which uses the frequency warping function selecting method based on the likelihood of the prior art example.
Figure 18:
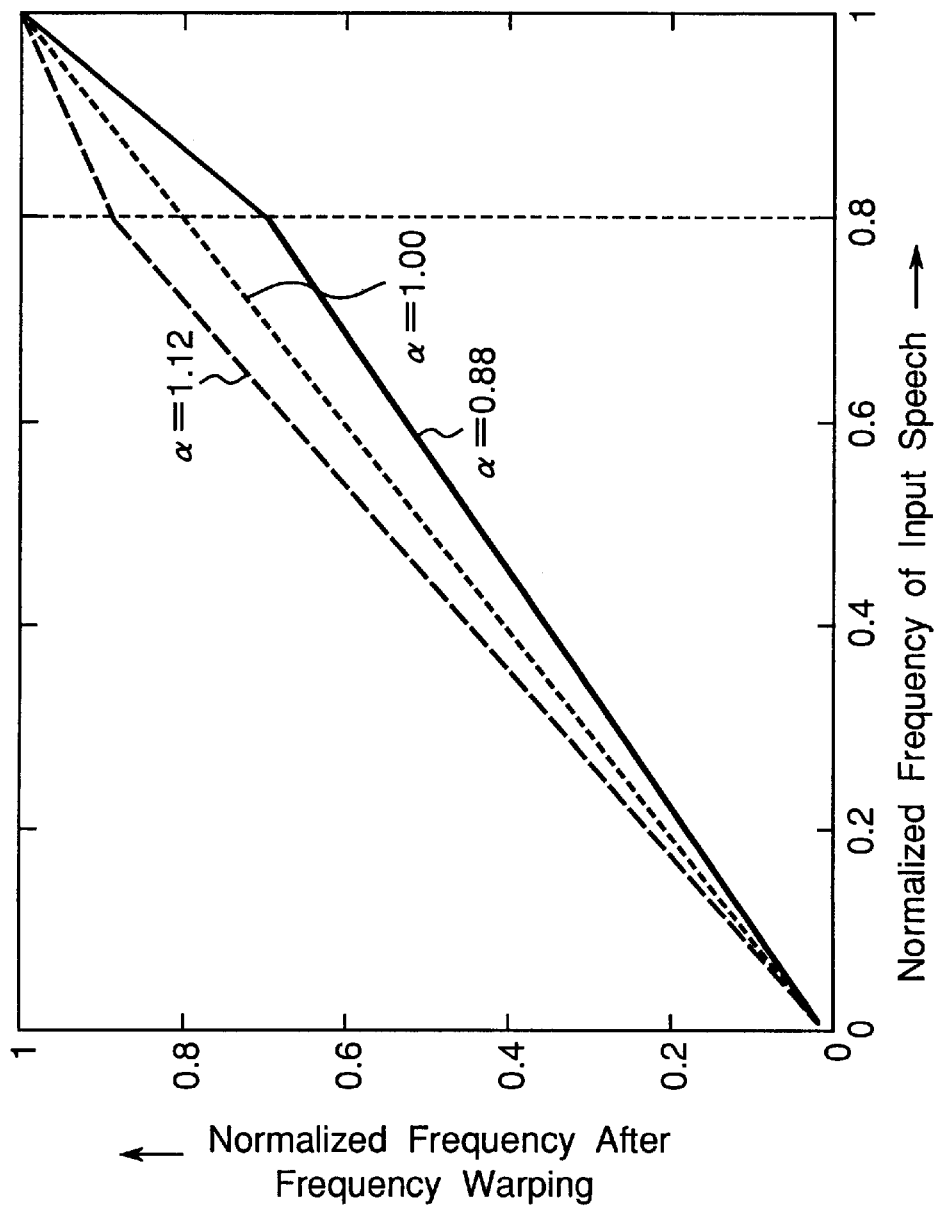
FIG. 18 is a graph showing examples of frequency warping functions of the prior art example.

FIGS. 15 and 16 show changes in the distribution of Formant frequencies (F1–F3) for vowel /a/ before and after frequency warping based on vocal-tract configuration parameters, with the 138 training speakers targeted. As a result of this, as can be remarkably seen particularly in the Formant frequency F2, it can be seen that the variances of Formant frequencies are reduced by the frequency warping, and that the speaker normalization has effectively functioned.

Next, evaluation of speaker normalization method according to the present invention was carried out by recognition experiments. The phoneme recognition rate is shown in Table 2:

TABLE 2

Comparison of performance of various types of acoustic models (phoneme recognition rate, %)

| VFS (Number of adaptation sentences) | | | | | | |
|---|---|---|---|---|---|---|
| GD | 1 | 10 | 20 | 30 | VTL | $l_1, l_2$ |
| 71.4 | 71.6 | 74.4 | 75.9 | 76.5 | 76.2 | 76.2 |

As apparent from Table 2, a recognition performance of 76.2% was obtained by performing speaker normalization based on a vocal-tract configuration. This recognition performance corresponds to an about 17% reduction of misrecognitions with the use of the male models, and a recognition performance higher than that of the models that have been speaker-adapted by the VFS method by using 20 adaptation data sentences. The estimation method for feature quantities of a vocal-tract configuration used in this experiment, in which a vocal-tract configuration is estimated only from speech data of two vowels, is capable of speaker adaptation with a small quantity of adaptation data even in the recognition, thus enabled to realize high-speed speaker adaptation.

As described above, according to the present preferred embodiment of the present invention, since a frequency warping function can be generated from vocal-tract configuration feature quantities and speech generation models extracted from Formant frequencies of two vowels, it becomes possible to implement speaker normalization based on a small quantity of speech data. Also, since it is unnecessary to specify the configuration of the frequency warping function in advance, as would be done in the frequency warping function selection method based on the likelihood (prior art), more detailed frequency warping functions can be generated. Thus, using the frequency warping function generated based on the method of the present preferred embodiment makes it possible to implement high-speed, high-performance speaker adaptation. Furthermore, for speech speech-recognition speaker normalization is done on speech signal data to be recognized by using a corresponding frequency warping function, and then by using HMMs obtained by feature extraction, speaker normalization and training. Therefore, the speech recognition can be accomplished at a higher speech recognition rate than the prior art example.

FIG. 19 is a view showing a modified Maeda model on the human vocal-tract configuration that can be applied to the preferred embodiment according to the present invention. This modified Maeda model is disclosed in, for example, Prior Art Document 5, Galvan, "Etudes dans le cadre de l'inversion acoustico-articulatoire: Amelioration of d'un modele articulatorie, normalisation du locuteur et recuperation du lieu de constriction des plosives", Theses de l'Institut National Polytechnique de Grenoble Specialite Sciences Congnitives, Avril, 1997. Parameters $z_1, z_2, \ldots, z_{25}$ for vocal-tract cross-sectional area showing widths of positions on the vocal tract can be expressed by the following equation:

$$\begin{bmatrix} z_1 \\ \cdots \\ \cdots \\ \cdots \\ z_{25} \end{bmatrix} = \begin{bmatrix} a_{1,1} & \cdots & a_{1,5} \\ \cdots & \cdots & \cdots \\ \cdots & \cdots & \cdots \\ \cdots & \cdots & \cdots \\ a_{25,1} & \cdots & a_{25,5} \end{bmatrix} \times \begin{bmatrix} j \\ b \\ d \\ t_x \\ t_y \end{bmatrix} + \begin{bmatrix} b_1 \\ \cdots \\ \cdots \\ \cdots \\ b_{25} \end{bmatrix}. \quad (18)$$

where j is the control position of the jaw, b and d are the control position of the tongue and parameters $t_x$ and $t_y$ are the control position of the lips. Also, $a_{1,1}, \ldots, a_{25,5}$ and $b_1, \ldots, b_{25}$ are model coefficients. Using these models allows approximation models approximate to the human vocal tract to be assumed.

Second Preferred Embodiment

Figure 20:
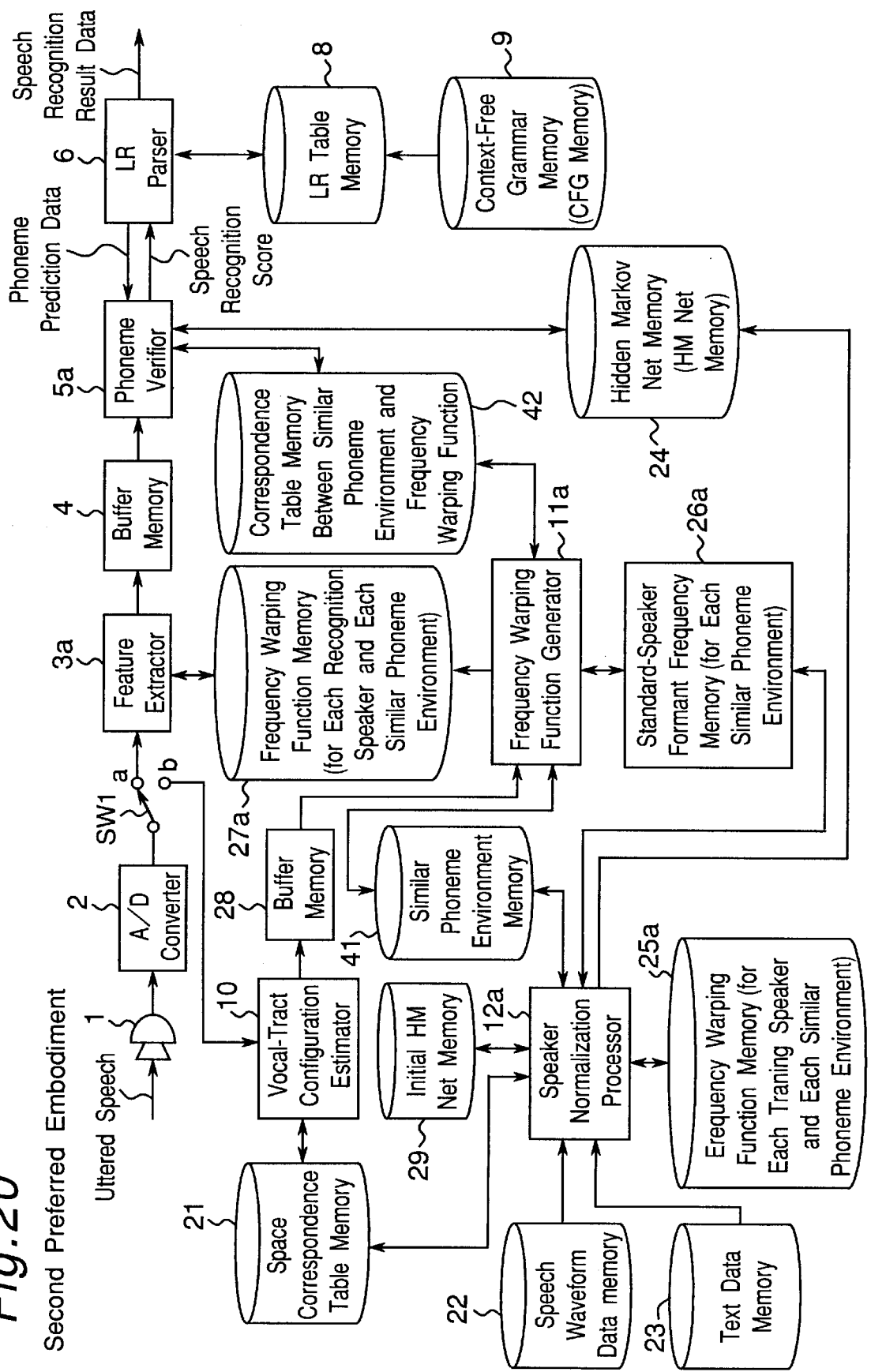
FIG. 20 is a block diagram showing a constitution of a speech recognition apparatus which is a second preferred embodiment of the present invention.

FIG. 20 is a block diagram showing a constitution of a speech recognition apparatus which is a second preferred embodiment according to the present invention. Although influences of differences in the vocal-tract configuration on speech uttered by each speaker are considered as considerably varying depending on differences in phoneme, uttered speech and the like, speaker normalization is performed by preparing a single frequency warping function for each speaker without taking into consideration those differences in the first preferred embodiment. In the second preferred embodiment, on the other hand, frequency warping is done by preparing a plurality of frequency warping functions for each of predetermined similar phoneme contexts that are similar in acoustic features to one another, and then in the speaker normalization and phoneme recognition processes, likelihoods are calculated by using acoustic analysis results with the use of different frequency warping functions for individual similar phoneme contexts. For preparation of these frequency warping functions, frequency warping functions are prepared for each of the following similar phoneme contexts or environments:

(a) individual vowels;
(b) individual phonemes;
(c) individual HMNet states, i.e., output probability densities; and
(d) among the (c) output probability densities of the HMNet, the same frequency warping function is shared by output probability density distributions that are predicted to be similar in acoustic features.

Like this, by preparing frequency warping functions according to similar phoneme contexts, the number of frequency warping functions which is used for the speaker normalization and the association between output probability density distribution and frequency warping function can be achieved.

The second preferred embodiment shown in FIG. 20 differs from the first preferred embodiment of FIG. 1 in that the speech recognition apparatus of this embodiment at the following points:

(a) further comprising a frequency warping function memory 25a for storing frequency warping functions for individual training speakers and individual similar phoneme contexts, instead of the frequency warping function memory 25;

(b) comprising a standard-speaker Formant frequency memory 26a for preparatorily storing standard-speaker Formant frequencies for individual similar phoneme contexts, instead of the standard-speaker Formant frequency memory 26;

(c) comprising a frequency warping function memory 27a for storing individual speech-recognition speakers and individual similar phoneme contexts, instead of the frequency warping function memory 27a;

(d) further comprising a similar phoneme context table memory 41 for preparatorily storing concentrate types of the similar phoneme context;

(e) further comprising an HMM state and frequency warping function correspondence table memory (hereinafter, referred to as correspondence table memory) 42 for storing the correspondence relation between the frequency warping functions for individual speech-recognition speakers and individual similar phoneme contexts stored in the frequency warping function memory 27a, and then, the individual states of HMMs stored in the HMNet memory 24 (the correspondence relation is generated by a later-described frequency warping function generator 11a);

(f) comprising a speaker normalization processor 12a for executing later-detailed speaker normalizing process for individual training speakers and individual similar phoneme contexts by looking up to the similar phoneme context table memory 41, instead of the speaker normalization processor 12;

(g) comprising a frequency warping function generator 11a for executing later-described frequency warping function generating process by looking up to the similar phoneme context table memory 41 and the standard-speaker Formant frequency memory 26a, instead of the frequency warping function generator 11;

(h) comprising a feature extractor 3a for executing the feature extracting process by looking up to the frequency warping function memory 27a, instead of the feature extractor 3; and (i) comprising a phoneme verifier 5 for executing a phoneme verifying process responsive to a similar phoneme context by looking up to the correspondence table memory 42, instead of the phoneme verifier 5.

The details of operations of these processors are described later.

In the first preferred embodiment, one frequency warping function independent of phonemes has been estimated for each speaker. However, in the second preferred embodiment, a plurality of frequency warping functions dependent on similar phoneme contexts such as vowels and phonemes are estimated. In the present preferred embodiment, the modified Maeda model shown in FIG. 19 is used.

Hereinbelow, processes different from those of the first preferred embodiment are described in detail. Referring to FIG. 20, the speaker normalization processor 12 executes the speaker normalizing process of FIG. 4 by further looking up to the similar phoneme context table memory 41 at further for individual similar phoneme contexts, i.e., estimates the frequency warping function for each training speaker and each similar phoneme context, and then, stores the estimated frequency warping function into the frequency warping function memory 25a, and subsequently executes the processes of steps S22 and S23 in the similar manner. In the generation of an HMNet at step S23, of course, an HMNet have HMMs associated with individual similar phoneme contexts is generated and stored into the HMNet memory 24.

The frequency warping function generator 11a, as in the first preferred embodiment, generates frequency warping functions and stores them into the frequency warping function memory 27a based on input vocal-tract configuration parameters and by looking up to the similar phoneme context table memory 41 and the standard-speaker Formant frequency memory 26a, and further generates information as to the correspondence between the generated frequency warping functions and similar phoneme contexts (i.e., information as to which frequency warping function corresponds to which similar phoneme context), in the process of generating the frequency warping functions, and then, stores them into the correspondence table memory 42. In addition, when the similar phoneme context is a state of HMM or output probability density distribution, the frequency warping function generator 11a generates information as to the correspondence between the HMM state or output probability density distribution and the generated frequency warping functions by further looking up to the HMNet memory 24, and then, stores the information into the correspondence table memory 42.

In the speech recognition, the feature extractor 3a performs frequency warping by using a plurality of frequency warping functions for a corresponding speech-recognition speaker and corresponding to a plurality of similar phoneme contexts stored in the frequency warping function memory 27a. After that, the feature extractor 3a performs acoustic analysis and transfers the resultant plurality of acoustic feature parameters to the phoneme verifier 5a via the buffer memory 4. In response to this, the phoneme verifier 5a performs a process similar to the process of the first preferred embodiment. In this case, when phoneme verification score is calculated, output possibility of each state of the HMM is calculated by looking up to the correspondence table memory 42 and with attention paid to the correspondence between similar phoneme contexts and frequency warping functions, for each of the plurality of acoustic feature parameters calculated using frequency warping functions for individual similar phoneme contexts, and then, the maximum likelihood (or the n-best likelihood) is calculated based on the plurality of output possibilities, by which the phoneme recognition process is achieved.

In the second preferred embodiment, the likelihood is calculated based on a plurality of output possibilities by calculating the output possibility of each HMM state for each of the plurality of acoustic feature parameters calculated using frequency warping functions corresponding to a plurality of similar phoneme contexts. Therefore, the degree of freedom in the phoneme recognition process can be broadened, so that phoneme recognition can be achieved by using acoustic feature parameters feature-extracted using frequency warping functions associated with more closely approximated similar phoneme contexts. As a result, the phoneme recognition rate can be improved to a great extent, compared with the prior art example and the first preferred embodiment.

EXPERIMENTAL EXAMPLES

Figure 21:
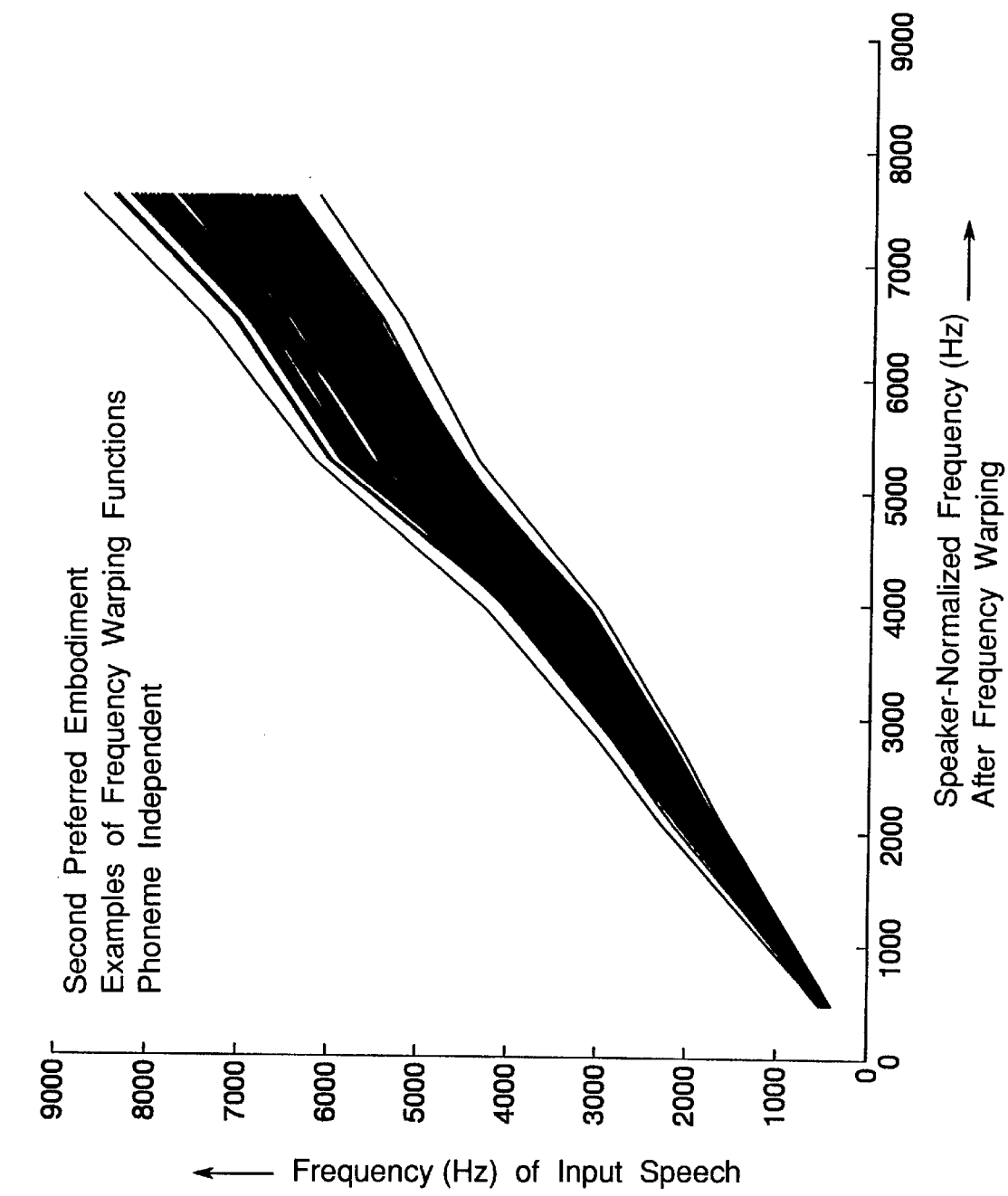
FIG. 21 is a graph which shows examples of frequency warping functions independent of phonemes used in the second preferred embodiment, and which is a graph of the frequency of input speech versus speaker-normalized frequency after frequency warping.
Figure 22:
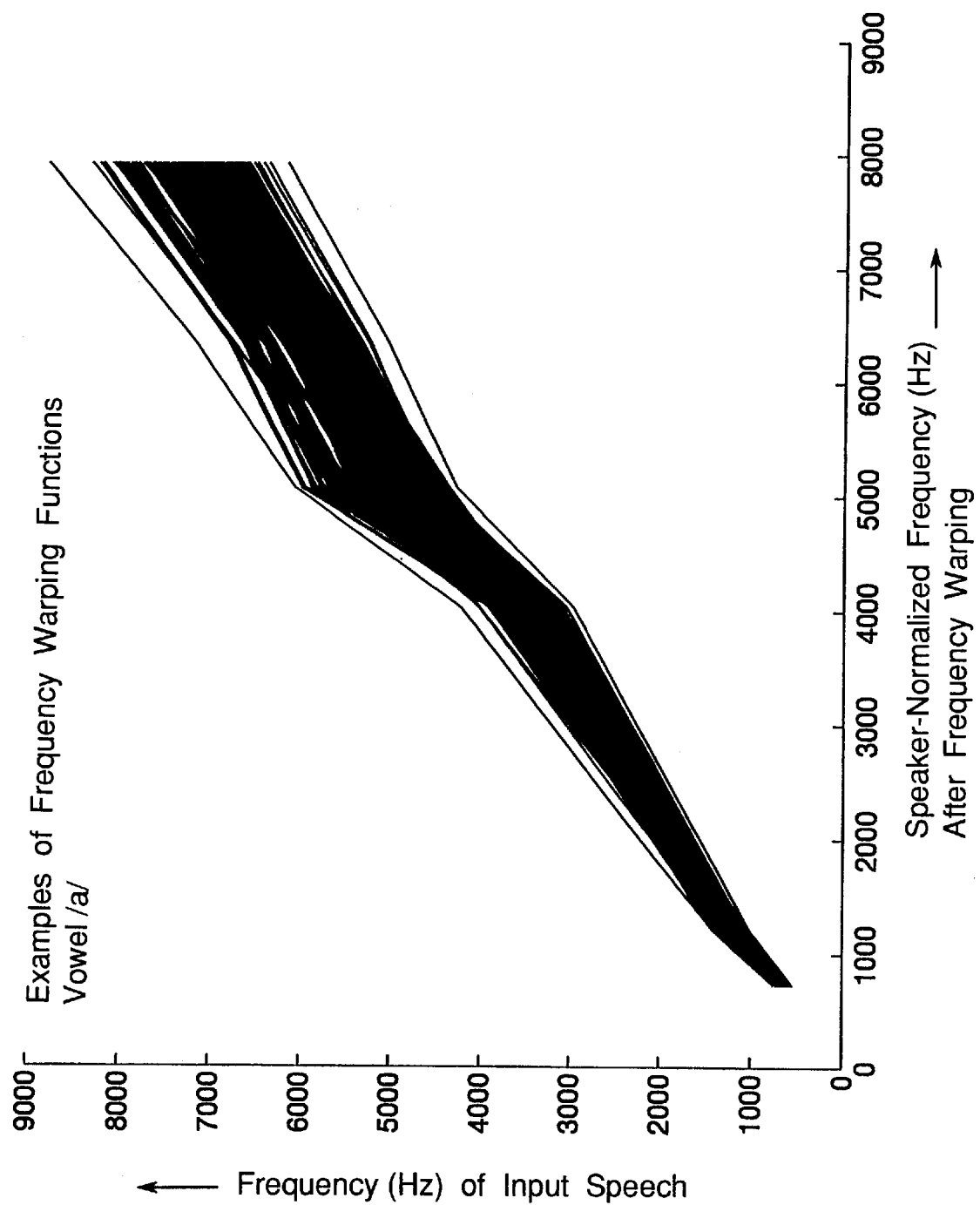
FIG. 22 is a graph which shows examples of frequency warping functions for vowel /a/ used in the second preferred embodiment, and which is a graph of the frequency of input speech versus speaker-normalized frequency after frequency warping.
Figure 23:
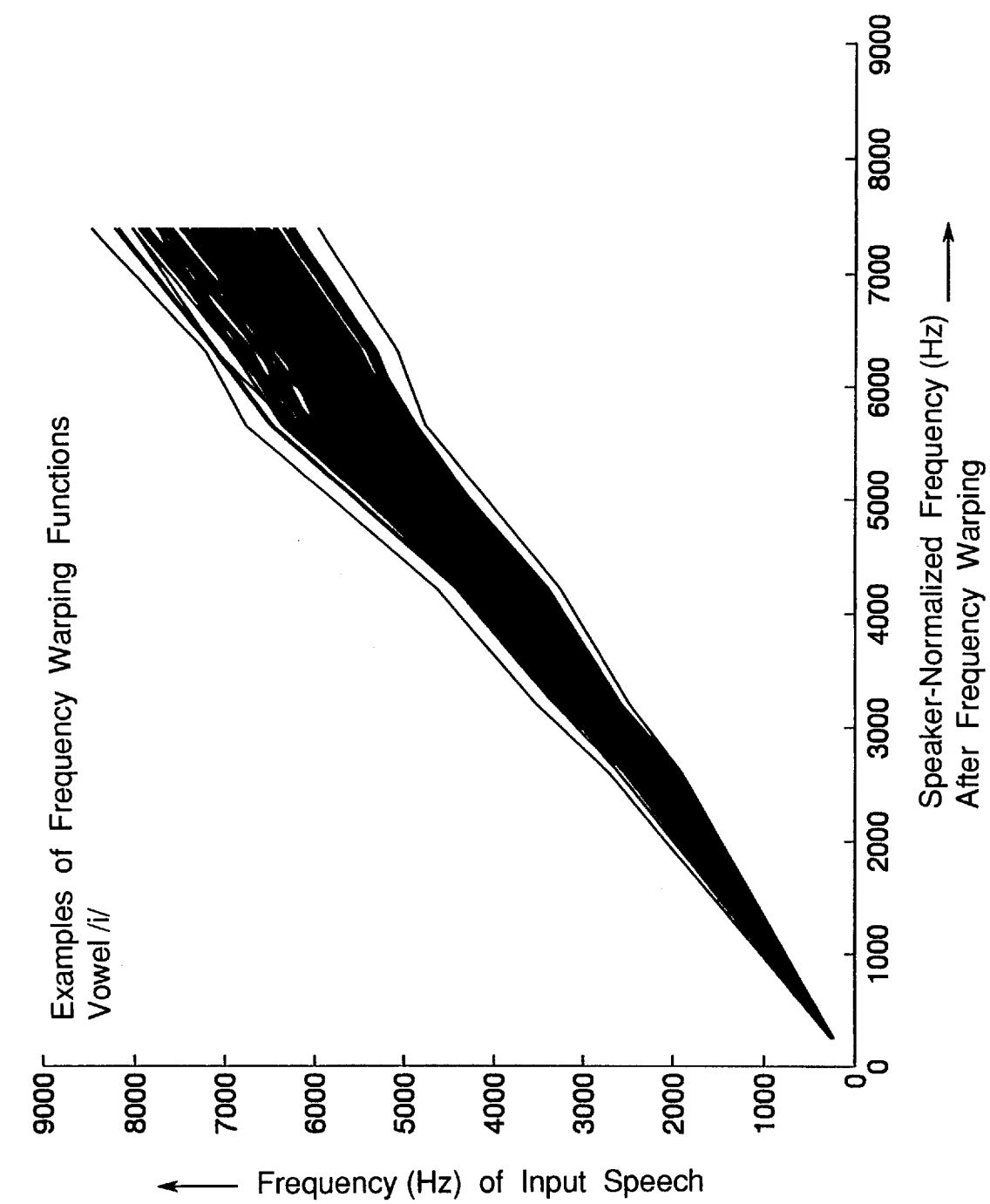
FIG. 23 is a graph which shows examples of frequency warping functions for vowel /i/ used in the second preferred embodiment, and which is a graph of the frequency of input speech versus speaker-normalized frequency after frequency warping.
Figure 24:
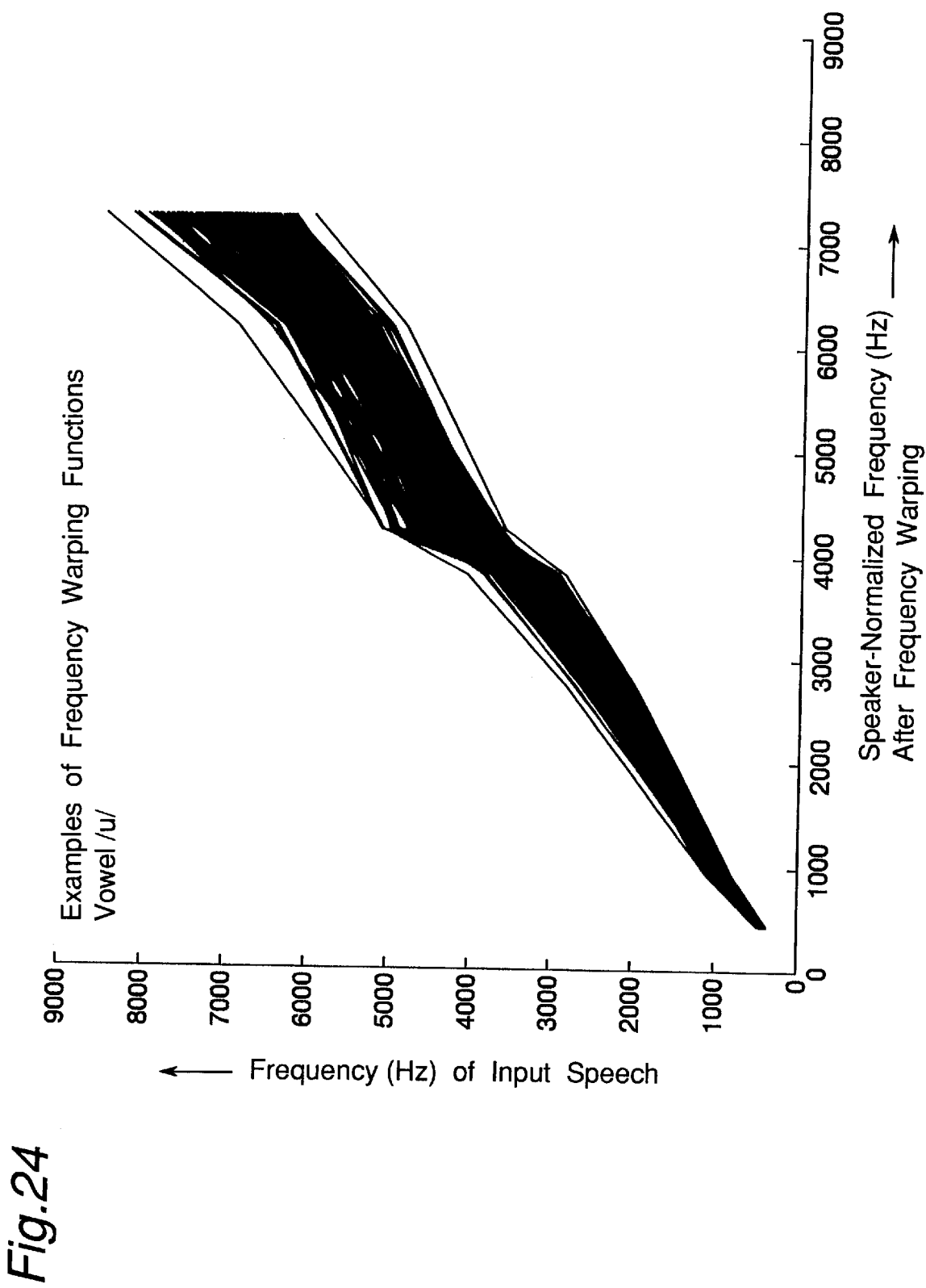
FIG. 24 is a graph which shows examples of frequency warping functions for vowel /u/ used in the second preferred embodiment, and which is a graph of the frequency of input speech versus speaker-normalized frequency after frequency warping.
Figure 25:
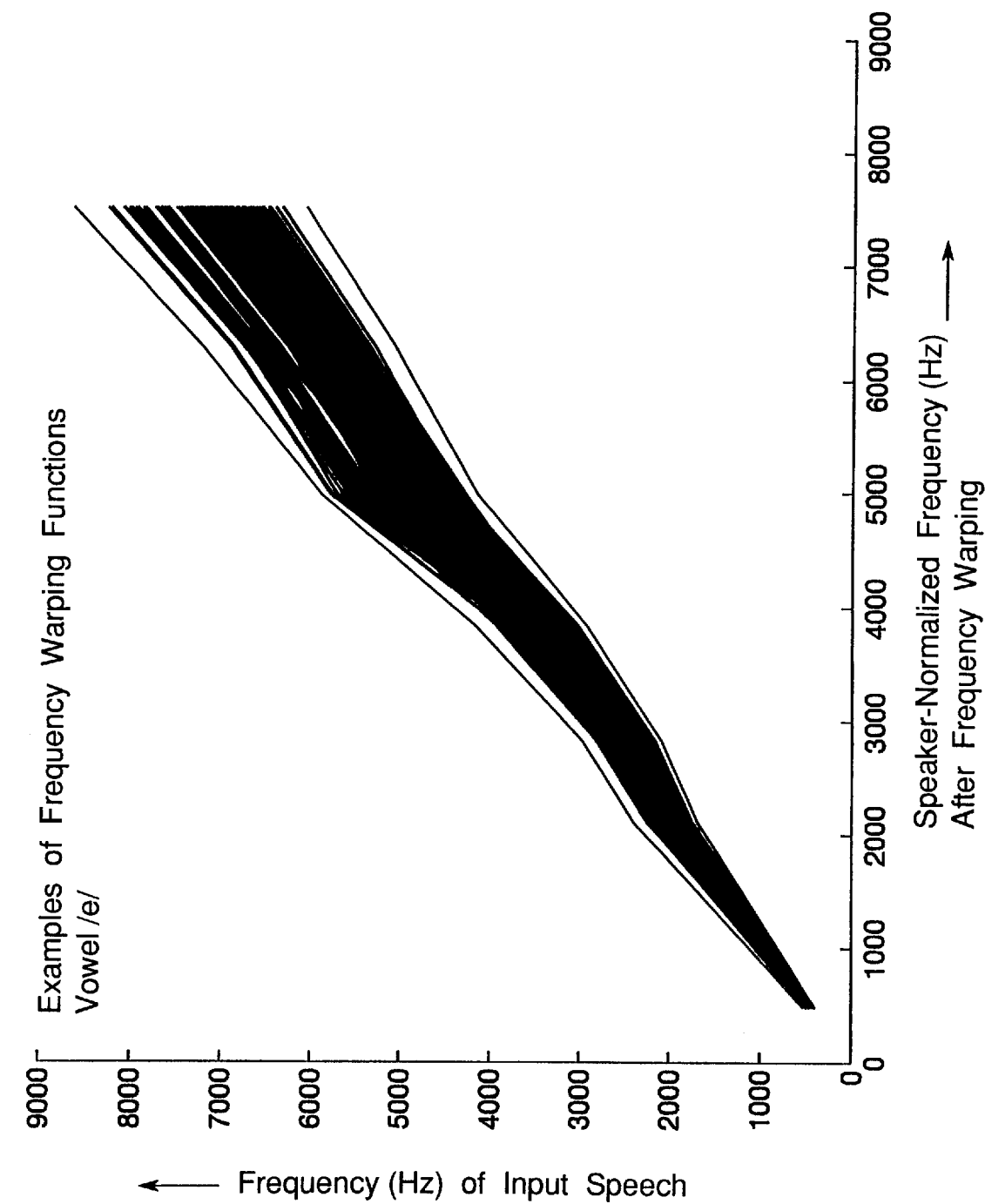
FIG. 25 is a graph which shows examples of frequency warping functions for vowel /e/ used in the second preferred embodiment, and which is a graph of the frequency of input speech versus speaker-normalized frequency after frequency warping.

FIG. 21 is a graph showing an example of frequency warping functions for individual phonemes used for the second preferred embodiment, being a graph of frequencies of input speech versus speaker-normalized frequencies after frequency warping. FIGS. 22 to 25 are graphs showing examples of frequency warping functions for individual vowels used in the second preferred embodiment, being graphs of frequencies of input speech versus speaker-normalized frequencies after frequency warping.

With the use of the above-mentioned frequency warping function estimating method according to the second preferred embodiment, the inventor executed function estimation on totally 148 Japanese male target speakers based on a speech database possessed by the present applicant. Results of this estimation are shown in FIG. 21. Individual curves correspond to the individual target speakers, respectively. A gentle, non-linear property of frequency warping is shown clearly, and then, the mean gradient of warping curves is related to the vocal tract length VT ($=l_1+l_2$). The non-uniformity of Formant scaling results described in the Prior Art Document 1 clearly suggests the phoneme dependency of speaker-to-speaker frequency warping. By giving VT models and calculation tools, such phoneme dependency in frequency warping functions can be simulated.

FIGS. 22 to 25 show four sets of frequency warping functions of the 148 Japanese males, the target speakers, on the four vowels, /a/, /i/, /u/ and /e/ in Japanese.

Next, an evaluation experiment and its results on a speaker normalizing apparatus with a recognition task of Japanese 26 phonemes are described. The experiment conditions are as shown in Table 3:

Table 3
Acoustic Analysis
  Sampling frequency: 12 kHz,
  Hamming window: 20 ms,
  Frame period: 5 ms,
  Filter bank power: 16,
  Parameters: log power+12-order MFCC +Δlog power+ 12-order ΔMFCC
HMM topology
  Has a state context dependent type HMM (HMNet) of concatenated 1000 states,
  where 10 mixed silence models of 3 states are provided
Estimation data of VT parameters
  Japanese 2 vowels /a/ and /i/ extracted from two words, "y-u-u-z-a-a", "f-a-m-i-r-i-i".

Training data
  128 male speakers (50 sentences per person)
Speech recognition data
  Random: 10 male speakers (50 sentences per person) (randomly selected from among the 148 male speakers)
  Worst 10: 10 male speakers (50 sentences per person) (10 worst speakers among the 148 male speakers)

In the present experiment, a sentence speech database possessed by the present applicant is used. According to two types of test speaker sets, from among the 148 speakers in this database, are selected (1) 10 random speakers (random), and (2) 10 speakers that resulted in the worst accuracies in the speech recognition experiment performed for speech data of all the 148 male speakers by using the gender-dependent HMM (worst 10). The remaining 128 speakers' data are used for the training of the speaker normalization HMM. Such an HMM was trained with respect to 50 sentences in Japanese (totally 2774 phonemes) uttered by the 128 male speakers.

The phoneme recognition experiment is executed by using the one-pass Viterbi algorithm and with constraints of Japanese syllables represented as phoneme versus grammar. Test data are made up of 50 sentences (totally 2905 phonemes) per person.

Table 4 shows phoneme mis-recognition rates acquired by using several different speaker normalization methods. An speaker-normalized HMM having five Gaussian mixes was trained by using the following speaker normalization methods:

(1) gender-dependent model (GD model);
(2) vocal-tract length normalization model (VTLN model);
(3) phoneme independent speaker normalization model (L1L2 PI model); and
(4) phoneme dependent speaker normalization model (L1L2 PD model).

In the case of VTLN, a frequency warping function can be expressed by the following equation:

$$f'=(\text{Ave } (VTL_{training}))/VTL_{target} \times f \tag{19}$$

where $VTL_{target}$ is the vocal tract length of a target speaker, and $\text{Ave}(VTL_{training})$ is the mean value of vocal tract lengths of the 128 training speakers.

Also, the frequency warping function and the speaker normalization method are largely affected by acoustic features of criterion speaker. In order to reduce such factors, in this experiment, Formant frequencies of speech are determined from vocal-tract area function of the 128 training speakers for individual similar phoneme contexts, and then, a frequency warping function is determined so that the mean value of the Formant frequencies and the Formant frequencies of a speaker to be normalized correspond to each other.

Results of this experiment are shown in Table 4:

TABLE 4

Phoneme mis-recognition rate with the use of four speaker normalization methods

| | Test set | | |
|---|---|---|---|
| Model | Random | Worst 10 | Mean value |
| GD | 15.36% | 28.16% | 21.76% |
| VTLN | 14.46% | 25.23% | 19.84% |
| L1L2 PI | 14.54% | 25.30% | 19.92% |
| L1L2 PD | 14.45% | 25.01% | 19.73% |

As apparent from Table 4, experiment results show that various speaker normalization methods reduced the phoneme mis-recognition rate by 8.5% to 9.5%, as compared with the GD model. It is the phoneme dependent speaker normalization method (L1L2 PD model) that reduced mis-recognitions the most, in which case the method reduced by 6.3% for the test set "random" and 11% for the test set "worst 10".

Further, the speaker normalization proposal method based on vocal tract length and the prior-art data drive type speaker adaptation method were compared with each other. A similar phoneme recognition experiment was executed by using speaker adaptation models trained by the mobile vector field smoothing method (VFS method) which has been known to those skilled in the art. The results of the experiment are shown in Table 5:

TABLE 5 phoneme mis-recognition rate (%) acquired by using speaker normalization models, and models speaker-adapted with N sentences by the VFS method

| | VFS method (Adapted with N sentences) | | | | | L1L2 | |
|---|---|---|---|---|---|---|---|
| GD | N = 1 | N = 2 | N = 3 | N = 6 | N = 10 | PI | PD |
| 28.16 | 27.13 | 25.82 | 25.42 | 22.96 | 20.38 | 25.30 | 25.01 |

Table 5 shows phoneme mis-recognition rates of the test set "worst 10". As apparent from Table 5, in the VFS method, speaker adaptation models trained by performing adaptation with speech data amount changed were used for the experiment. Experiment results show that the present invention, while requiring only two vowels to estimate vocal-tract parameters used for speaker normalization, is capable of obtaining performance equivalent to that obtained with models speaker adapted by the VFS method and by using about three sentences for adaptation.

As described above, the present invention discloses a speaker normalizing apparatus using a speaker normalizing method for speech recognition that uses vocal-tract configuration dimension parameters based on vocal tract models. In this case, for the normalization of acoustic features of speakers, is used a non-linear frequency warping function estimated based on Formant frequencies having the geometric configuration of each speaker's vocal tract approximately calculated by deforming the vocal tract model of a standard speaker. This normalization method further provides detailed non-linear frequency warping functions unique to individual phonemes by handling the vocal-tract parameters. The results of the phoneme recognition experiment in Japanese show that our new speaker normalization method reduces the phoneme mis-recognition rate by 9.5% relative to the GD model. Besides, the present method excels in performance over the prior-art data drive type speaker adaptation method and normalization method, while the method reduces the data amount of adaptation necessary for the estimation of speaker normalization parameters to a large extent.

Consequently, by performing phoneme recognition using frequency warping functions for individual similar phoneme contexts according to the second preferred embodiment, a greatly improved phoneme recognition rate can be obtained while the data amount of adaptation necessary for the estimation of speaker normalization parameters can be reduced to a large extent.

According to the preferred embodiments of the present invention, since frequency warping functions can be generated from vocal-tract feature quantities extracted from Formant frequencies of uttered speech and speech generation models, speaker normalization based on a small quantity of speech data is enabled. Also, since there is no need of previously specifying the configuration of frequency warping functions, as would be involved in the selection method of frequency warping functions based on the likelihood (prior art example), more detailed frequency warping functions can be generated. By this advantage, using frequency warping functions generated based on the method of the present invention makes it possible to realize high-speed, high-performance speaker adaptation. Further, because speech recognition is performed by using an HMM which is obtained by performing speaker normalization using a corresponding frequency warping function for speech signal data to be recognized, and by thereafter performing feature extraction, speaker normalization and training, it becomes possible to accomplish speech recognition with higher speech recognition rates as compared with the prior art example.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A speaker normalization processor apparatus comprising:

a first storage unit for storing speech waveform data of a plurality of normalization-target speakers and text data corresponding to the speech waveform data;

a second storage unit for storing Formant frequencies of a standard speaker determined based on a vocal-tract area function of the standard speaker;

estimation means for estimating feature quantities of a vocal-tract configuration showing an anatomical configuration of a vocal tract of each normalization-target speaker, by looking up to a correspondence between vocal-tract configuration parameters and Formant frequencies previously determined based on a vocal tract model of the standard speaker, based on the speech waveform data of each normalization-target speaker stored in said first storage unit;

function generating means for estimating a vocal-tract area function of each normalization-target speaker by changing feature quantities of a vocal-tract configuration of the standard speaker based on the feature quantities of the vocal-tract configuration of each normalization-target speaker estimated by said estimation means and the feature quantities of the vocal-tract configuration of the standard speaker, estimating Formant frequencies of speech uttered by each normalization-target speaker based on the estimated vocal-tract area function of each normalization-target speaker, and generating a frequency warping function, which shows a correspondence between input speech frequencies and frequencies after frequency warping, and which is used for performing the frequency warping by converting an input speech frequency so that Formant frequencies of speech of each normalization-target speaker after the frequency warping respectively coincide with the corresponding Formant frequencies of the standard speaker stored in said second storage unit.

2. A speaker normalization processor apparatus comprising:
- a first storage unit for storing speech waveform data of a plurality of training speakers and text data corresponding to the speech waveform data;
- a second storage unit for storing Formant frequencies of a standard speaker determined based on a vocal-tract area function of the standard speaker;
- first estimation means for estimating feature quantities of a vocal-tract configuration showing an anatomical configuration of a vocal tract of each training speaker, by looking up to a correspondence between vocal-tract configuration parameters and Formant frequencies previously determined based on a vocal tract model of the standard speaker, based on the speech waveform data of each training speaker stored in said first storage unit;
- first function generating means for estimating a vocal-tract area function of each training speaker by changing feature quantities of a vocal-tract configuration of the standard speaker based on the feature quantities of the vocal-tract configuration of each training speaker estimated by said first estimation means and the feature quantities of the vocal-tract configuration of the standard speaker, estimating Formant frequencies of speech uttered by each training speaker based on the estimated vocal-tract area function of each training speaker, and generating a frequency warping function, which shows a correspondence between input speech frequencies and frequencies after frequency warping, and which is used for performing the frequency warping by converting an input speech frequency so that Formant frequencies of speech of each training speaker after the frequency warping respectively coincide with the corresponding Formant frequencies of the standard speaker stored in said second storage unit;
- first feature extraction means for speaker-normalizing speech waveform data of each training speaker stored in said first storage unit, by executing a frequency warping process on the speech waveform data using the frequency warping function of each training speaker generated by said first function generating means, and then extracting predetermined acoustic feature parameters of each training speaker from the speaker-normalized speech waveform data; and
- training means for generating a normalized hidden Markov model by training a predetermined initial hidden Markov model using a predetermined training method based on the acoustic feature parameters of each training speaker extracted by said first feature extraction means and the text data stored in said first storage unit.

3. The speaker normalization processor apparatus as claimed in claim 2,
- wherein the feature quantities of the vocal-tract configuration include a first length on an oral cavity side and a second length on a pharyngeal cavity side of a vocal tract of a speaker.

4. The speaker normalization processor apparatus as claimed in claim 2,
- wherein the acoustic feature parameters include mel-frequency cepstrum coefficients.

5. A speech recognition apparatus comprising:
- a first storage unit for storing speech waveform data of a plurality of training speakers and text data corresponding to the speech waveform data;
- a second storage unit for storing Formant frequencies of a standard speaker determined based on a vocal-tract area function of the standard speaker;
- first estimation means for estimating feature quantities of a vocal-tract configuration showing an anatomical configuration of a vocal tract of each training speaker, by looking up to a correspondence between vocal-tract configuration parameters and Formant frequencies previously determined based on a vocal tract model of the standard speaker, based on the speech waveform data of each training speaker stored in said first storage unit;
- first function generating means for estimating a vocal-tract area function of each training speaker by changing feature quantities of a vocal-tract configuration of the standard speaker based on the feature quantities of the vocal-tract configuration of each training speaker estimated by said first estimation means and the feature quantities of the vocal-tract configuration of the standard speaker, estimating Formant frequencies of speech uttered by each training speaker based on the estimated vocal-tract area function of each training speaker, and generating a frequency warping function, which shows a correspondence between input speech frequencies and frequencies after frequency warping, and which is used for performing the frequency warping by converting an input speech frequency so that Formant frequencies of speech of each training speaker after the frequency warping respectively coincide with the corresponding Formant frequencies of the standard speaker stored in said second storage unit;
- first feature extraction means for speaker-normalizing speech waveform data of each training speaker stored in said first storage unit, by executing a frequency warping process on the speech waveform data using the frequency warping function of each training speaker generated by said first function generating means, and then extracting predetermined acoustic feature parameters of each training speaker from the speaker-normalized speech waveform data;
- training means for generating a normalized hidden Markov model by training a predetermined initial hidden Markov model using a predetermined training method based on the acoustic feature parameters of each training speaker extracted by said first feature extraction means and the text data stored in said first storage unit;
- second estimation means for estimating feature quantities of a vocal-tract configuration showing an anatomical configuration of a vocal tract of a speech-recognition speaker, by looking up to a correspondence between vocal-tract configuration parameters and Formant frequencies previously determined based on a vocal tract model of the standard speaker, based on input speech waveform data for adaptation of a speech-recognition speaker;
- second function generating means for estimating a vocal-tract area function of each speech-recognition speaker by changing the feature quantities of the vocal-tract configuration of the standard speaker based on the feature quantities of the vocal-tract configuration of the speech-recognition speaker estimated by said second estimation means and the feature quantities of the vocal-tract configuration of the standard speaker, estimating Formant frequencies of speech uttered by each speech-recognition speaker based on the estimated vocal-tract area function of each speech-recognition speaker, and generating a frequency warping function of the speech-recognition speaker, which shows a correspondence between input speech frequencies and frequencies after frequency warping, and which is used for performing the frequency warping by converting an input speech frequency so that Formant frequencies of speech of each speech-recognition speaker after the frequency warping respectively coincide with the corresponding Formant frequencies of the standard speaker stored in said second storage unit;

a third storage unit for storing the frequency warping function of a speech-recognition speaker generated by said second function generating means;

second feature extraction means for speaker-normalizing speech waveform data of speech uttered by a speech-recognition speaker to be recognized by executing a frequency warping process on the speech waveform data using the frequency warping function of the speech-recognition speaker stored in said third storage unit, and then extracting predetermined acoustic feature parameters of the speech-recognition speaker from the speaker-normalized speech waveform data; and speech recognition means for recognizing the input speech uttered by the speech-recognition speaker by using a hidden Markov model generated by said training means based on the acoustic feature parameters extracted by said second feature extraction means, and then outputting a result of the speech recognition.

6. A speaker normalization processor apparatus comprising:

a first storage unit for storing speech waveform data of a plurality of normalization-target speakers and text data corresponding to the speech waveform data;

a second storage unit for storing Formant frequencies of a standard speaker determined based on a vocal-tract area function of the standard speaker;

estimation means for estimating feature quantities of a vocal-tract configuration showing an anatomical configuration of a vocal tract of each normalization-target speaker, for each of predetermined similar phoneme contexts that are similar in acoustic features to each other, by looking up to a correspondence between vocal-tract configuration parameters and Formant frequencies previously determined based on a vocal tract model of the standard speaker, based on the speech waveform data of each normalization-target speaker stored in said first storage unit;

function generating means for estimating, for each of the similar phoneme contexts, a vocal-tract area function of each normalization-target speaker by changing feature quantities of a vocal-tract configuration of the standard speaker based on the feature quantities of the vocal-tract configuration of each normalization-target speaker estimated for each of the similar phoneme contexts by said estimation means and the feature quantities of the vocal-tract configuration of the standard speaker, estimating Formant frequencies of speech uttered by each normalization-target speaker based on the vocal-tract area function of each normalization-target speaker estimated for each of the similar phoneme contexts, and generating for each of the similar phoneme contexts a frequency warping function, which shows a correspondence between input speech frequencies and frequencies after frequency warping, and which is used for performing the frequency warping by converting an input speech frequency so that Formant frequencies of speech of each normalization-target speaker after the frequency warping respectively coincide with the corresponding Formant frequencies of the standard speaker stored in said second storage unit.

7. A speech recognition apparatus comprising:

a first storage unit for storing speech waveform data of a plurality of training speakers and text data corresponding to the speech waveform data;

a second storage unit for storing, for each of predetermined similar phoneme contexts that are similar in acoustic features to one another, Formant frequencies of a standard speaker determined based on a vocal-tract area function of the standard speaker;

first estimation means for estimating, for each of the similar phoneme contexts, feature quantities of a vocal-tract configuration showing an anatomical configuration of a vocal tract of each training speaker, by looking up to a correspondence between vocal-tract configuration parameters and Formant frequencies previously determined based on a vocal tract model of the standard speaker, based on the speech waveform data of each training speaker stored in said first storage unit;

first function generating means for estimating, for each of the similar phoneme contexts, a vocal-tract area function of each training speaker by changing feature quantities of a vocal-tract configuration of the standard speaker based on the feature quantities of the vocal-tract configuration of each training speaker estimated for each of the similar phoneme contexts by said first estimation means and the feature quantities of the vocal-tract configuration of the standard speaker, estimating for each of the similar phoneme contexts, Formant frequencies of speech uttered by each training speaker based on the vocal-tract area function of each training speaker estimated for each of the similar phoneme contexts, and generating for each of the similar phoneme contexts a frequency warping function, which shows a correspondence between input speech frequencies and frequencies after frequency warping, and which is used for performing the frequency warping by converting an input speech frequency so that Formant frequencies of speech of each training speaker after the frequency warping respectively coincide with the corresponding Formant frequencies of the standard speaker stored in said second storage unit;

first feature extraction means for speaker-normalizing the speech waveform data of each training speaker stored in said first storage unit by executing a frequency warping process on the speech waveform data using the frequency warping function of each training speaker generated for each of the similar phoneme contexts by said first function generating means, and then extracting, for each of the similar phoneme contexts, predetermined acoustic feature parameters of each training speaker from the speaker-normalized speech waveform data; and training means for generating a normalized hidden Markov model by training a predetermined initial hidden Markov model using a predetermined training method based on the acoustic feature parameters of each training speaker extracted for each of the similar phoneme contexts by said first feature extraction means and the text data stored in said first storage unit.

8. The speaker normalization processor apparatus as claimed in claim 7, wherein the feature quantities of the vocal-tract configuration include parameters of vocal-tract cross sections ranging from an oral cavity side to a pharyngeal cavity side of a vocal tract of a speaker.

9. The speaker normalization processor apparatus as claimed in claim 7,
   wherein the similar phoneme context includes at least one of vowel, phoneme, and hidden Markov model state.

10. A speech recognition apparatus comprising:
   a first storage unit for storing speech waveform data of a plurality of training speakers and text data corresponding to the speech waveform data;
   a second storage unit for storing, for each of predetermined similar phoneme contexts that are similar in acoustic features to one another, Formant frequencies of a standard speaker determined based on a vocal-tract area function of the standard speaker;
   first estimation means for estimating, for each of the similar phoneme contexts, feature quantities of a vocal-tract configuration showing an anatomical configuration of a vocal tract of each training speaker, by looking up to a correspondence between vocal-tract configuration parameters and Formant frequencies previously determined based on a vocal tract model of the standard speaker, based on the speech waveform data of each training speaker stored in said first storage unit;
   first function generating means for estimating, for each of the similar phoneme contexts, a vocal-tract area function of each training speaker by changing feature quantities of a vocal-tract configuration of the standard speaker based on the feature quantities of the vocal-tract configuration of each training speaker estimated for each of the similar phoneme contexts by said first estimation means and the feature quantities of the vocal-tract configuration of the standard speaker, estimating for each of the similar phoneme contexts, Formant frequencies of speech uttered by each training speaker based on the vocal-tract area function of each training speaker estimated for each of the similar phoneme contexts, and generating for each of the similar phoneme contexts a frequency warping function, which shows a correspondence between input speech frequencies and frequencies after frequency warping, and which is used for performing the frequency warping by converting an input speech frequency so that Formant frequencies of speech of each training speaker after the frequency warping respectively coincide with the corresponding Formant frequencies of the standard speaker stored in said second storage unit;
   first feature extraction means for speaker-normalizing the speech waveform data of each training speaker stored in said first storage unit by executing a frequency warping process on the speech waveform data using the frequency warping function of each training speaker generated for each of the similar phoneme contexts by said first function generating means, and then extracting, for each of the similar phoneme contexts, predetermined acoustic feature parameters of each training speaker from the speaker-normalized speech waveform data;
   training means for generating a normalized hidden Markov model by training a predetermined initial hidden Markov model using a predetermined training method based on the acoustic feature parameters of each training speaker extracted for each of the similar phoneme contexts by said first feature extraction means and the text data stored in said first storage unit;
   second estimation means for estimating, for each of the similar phoneme contexts, feature quantities of a vocal-tract configuration showing an anatomical configuration of a vocal tract of a speech-recognition speaker, by looking up to a correspondence between vocal-tract configuration parameters and Formant frequencies previously determined based on a vocal tract model of the standard speaker, based on input speech waveform data for adaptation of a speech-recognition speaker;
   second function generating means for estimating, for each of the similar phoneme contexts, a vocal-tract area function of each speech-recognition speaker by converting the feature quantities of the vocal-tract configuration of the standard speaker based on the feature quantities of the vocal-tract configuration of the speech-recognition speaker estimated for each of the similar phoneme contexts by said second estimation means and the feature quantities of the vocal-tract configuration of the standard speaker, estimating for each of the similar phoneme contexts, Formant frequencies of speech uttered by each speech-recognition speaker based on the vocal-tract area function of each speech-recognition speaker estimated for each of the similar phoneme contexts, generating for each of the similar phoneme contexts a frequency warping function of the speech-recognition speaker, which shows a correspondence between input speech frequencies and frequencies after frequency warping, and which is used for performing the frequency warping by converting an input speech frequency so that Formant frequencies of speech of each speech-recognition speaker after the frequency warping respectively coincide with the corresponding Formant frequencies of the standard speaker stored in said second storage unit, and further generating information as to correspondence between the similar phoneme contexts and the frequency warping functions;
   a third storage unit for storing the frequency warping function of a speech-recognition speaker generated for each of the similar phoneme contexts by said second function generating means;
   a fourth storage unit for storing the information as to the correspondence between the similar phoneme contexts and the frequency warping functions of the speech-recognition speaker generated by said second function generating means;
   second feature extraction means for speaker-normalizing the speech waveform data of speech uttered by a speech-recognition speaker to be recognized by executing a frequency warping process on the speech waveform data using the frequency warping function of the speech-recognition speaker stored for each of the similar phoneme contexts in said third storage unit, and then extracting for each of the similar phoneme contexts predetermined acoustic feature parameters of the speech-recognition speaker from the speaker-normalized speech waveform data; and
   speech recognition means for recognizing the input speech uttered by the speech-recognition speaker by looking up to the information as to the correspondence between the similar phoneme contexts and the frequency warping functions of the speech-recognition speaker stored in said fourth storage unit, and by using a hidden Markov model generated by said training means based on the acoustic feature parameters extracted for each of the similar phoneme contexts by said second feature extraction means, and then outputting a result of the speech recognition.

* * * * *